(12) United States Patent
Tau et al.

(10) Patent No.: US 7,459,500 B2
(45) Date of Patent: Dec. 2, 2008

(54) THERMOPLASTIC ELASTOMER COMPOSITIONS

(75) Inventors: Li-Min Tau, Lake Jackson, TX (US); Yunwa Wilson Cheung, Lake Jackson, TX (US); Charles F. Diehl, Lake Jackson, TX (US); Lonnie G. Hazlitt, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 474 days.

(21) Appl. No.: 10/429,651

(22) Filed: May 5, 2003

(65) Prior Publication Data

US 2004/0087751 A1    May 6, 2004

(51) Int. Cl.
  C08F 8/00    (2006.01)

(52) U.S. Cl. .................... 525/191; 526/348; 525/62

(58) Field of Classification Search ............... 525/191; 526/348

See application file for complete search history.

(56) References Cited

U.S. PATENT DOCUMENTS

| | | | |
|---|---|---|---|
| 3,520,861 | A | 7/1970 | Thomson et al. |
| 4,076,698 | A | 2/1978 | Anderson et al. |
| 4,271,060 | A | 6/1981 | Hubby |
| 4,542,199 | A | 9/1985 | Kaminsky et al. |
| 4,543,399 | A | 9/1985 | Jenkins, III et al. |
| 4,544,762 | A | 10/1985 | Kaminsky et al. |
| 4,588,790 | A | 5/1986 | Jenkins, III et al. |
| 4,599,392 | A | 7/1986 | McKinney et al. |
| 4,665,208 | A | 5/1987 | Welborn, Jr. et al. |
| 4,874,734 | A | 10/1989 | Kioka et al. |
| 4,874,880 | A | 10/1989 | Miya et al. |
| 4,908,463 | A | 3/1990 | Bottelberghe |
| 4,924,018 | A | 5/1990 | Bottelberghe |
| 4,952,540 | A | 8/1990 | Kioka et al. |
| 4,960,878 | A | 10/1990 | Crapo et al. |
| 4,968,827 | A | 11/1990 | Davis |
| 4,988,781 | A | 1/1991 | McKinney et al. |

(Continued)

FOREIGN PATENT DOCUMENTS

EP    0 229 476 B1    7/1987

(Continued)

OTHER PUBLICATIONS

Alt, Helmut G., et al., Chem. Rev. 2000, 100, 1205-1221.

(Continued)

*Primary Examiner*—William K Cheung
(74) *Attorney, Agent, or Firm*—Whyte Hirschboeck Dudek SC

(57) ABSTRACT

A unique thermoplastic olefin composition having: (a) at least 40 percent by weight of a propylene-alpha olefin copolymer based on the total weight of polymers in the composition, the propylene-alpha olefin copolymer having at least 60 percent by weight units derived from propylene, at least 6 percent by weight units derived from an alpha olefin, a molecular weight distribution less than 3.5, and a broad composition distribution; and (b) at least 20 percent by weight of a polypropylene based on the total weight of polymers in the composition, the polypropylene having at least 93 percent by weight units derived from propylene, a molecular weight distribution of greater than 3.5, a heat of fusion greater than the heat of fusion exhibited by the propylene-alpha olefin copolymer, and a melting point $T_{max}$ of at least 120° C.

2 Claims, 19 Drawing Sheets

U.S. PATENT DOCUMENTS

| | | | |
|---|---|---|---|
| 5,001,205 A | 3/1991 | Hoel | |
| 5,015,749 A | 5/1991 | Schmidt et al. | |
| 5,028,670 A | 7/1991 | Chinh et al. | |
| 5,032,562 A | 7/1991 | Lo et al. | |
| 5,041,583 A | 8/1991 | Sangokoya | |
| 5,041,584 A | 8/1991 | Crapo et al. | |
| 5,041,585 A | 8/1991 | Deavenport et al. | |
| 5,044,438 A | 9/1991 | Young | |
| 5,057,475 A | 10/1991 | Canich et al. | |
| 5,064,802 A | 11/1991 | Stevens et al. | |
| 5,066,741 A | 11/1991 | Campbell, Jr. | |
| 5,091,352 A | 2/1992 | Kioka et al. | |
| 5,093,415 A | 3/1992 | Brady, III et al. | |
| 5,096,867 A | 3/1992 | Canich | |
| 5,103,031 A | 4/1992 | Smith, Jr. | |
| 5,106,804 A | 4/1992 | Bailly et al. | |
| 5,132,380 A | 7/1992 | Stevens et al. | |
| 5,134,209 A | 7/1992 | Job et al. | |
| 5,153,157 A | 10/1992 | Hlatky et al. | |
| 5,157,137 A | 10/1992 | Sangokoya | |
| 5,198,401 A | 3/1993 | Turner et al. | |
| 5,204,419 A | 4/1993 | Tsutsui et al. | |
| 5,206,197 A | 4/1993 | Campbell, Jr. | |
| 5,206,199 A | 4/1993 | Kioka et al. | |
| 5,218,071 A | 6/1993 | Tsutsui et al. | |
| 5,235,081 A | 8/1993 | Sangokoya | |
| 5,236,998 A | 8/1993 | Lundeen et al. | |
| 5,241,025 A | 8/1993 | Hlatky et al. | |
| 5,248,801 A | 9/1993 | Sangokoya | |
| 5,272,236 A | 12/1993 | Lai et al. | |
| 5,278,272 A | 1/1994 | Lai et al. | |
| 5,296,433 A | 3/1994 | Siedle et al. | |
| 5,308,815 A | 5/1994 | Sangokoya | |
| 5,324,800 A | 6/1994 | Welborn, Jr. et al. | |
| 5,329,032 A | 7/1994 | Tran et al. | |
| 5,350,723 A | 9/1994 | Neithamer et al. | |
| 5,352,749 A | 10/1994 | DeChellis et al. | |
| 5,384,299 A | 1/1995 | Turner et al. | |
| 5,384,373 A | 1/1995 | McKinney et al. | |
| 5,391,529 A | 2/1995 | Sangokoya | |
| 5,391,793 A | 2/1995 | Marks et al. | |
| 5,405,922 A | 4/1995 | DeChellis et al. | |
| 5,408,017 A | 4/1995 | Turner et al. | |
| 5,427,991 A | 6/1995 | Turner | |
| 5,436,304 A | 7/1995 | Griffin et al. | |
| 5,453,471 A | 9/1995 | Bernier et al. | |
| 5,461,123 A | 10/1995 | Song et al. | |
| 5,462,999 A | 10/1995 | Griffin et al. | |
| 5,473,028 A | 12/1995 | Nowlin et al. | |
| 5,502,124 A | 3/1996 | Crowther et al. | |
| 5,504,049 A | 4/1996 | Crowther et al. | |
| 5,504,172 A | 4/1996 | Imuta et al. | |
| 5,541,270 A | 7/1996 | Chinh et al. | |
| 5,556,238 A | 9/1996 | Chinh | |
| 5,556,928 A | 9/1996 | Devore et al. | |
| 5,589,555 A | 12/1996 | Zboril et al. | |
| 5,599,761 A | 2/1997 | Turner | |
| 5,608,019 A | 3/1997 | Cheruvu et al. | |
| 5,616,661 A | 4/1997 | Eisinger et al. | |
| 5,616,664 A | 4/1997 | Timmers et al. | |
| 5,621,127 A | 4/1997 | Langhauser et al. | |
| 5,625,087 A | 4/1997 | Devore et al. | |
| 5,637,660 A | 6/1997 | Nagy et al. | |
| 5,685,128 A | 11/1997 | Chum et al. | |
| 5,693,838 A | 12/1997 | Sangokoya et al. | |
| 5,703,187 A | 12/1997 | Timmers | |
| 5,703,257 A | 12/1997 | Rosen et al. | |
| 5,710,224 A | 1/1998 | Alt et al. | |
| 5,721,185 A | 2/1998 | LaPointe et al. | |
| 5,728,855 A | 3/1998 | Smith et al. | |
| 5,731,253 A | 3/1998 | Sangokoya et al. | |
| 5,731,451 A | 3/1998 | Smith et al. | |
| 5,744,656 A | 4/1998 | Askham | |
| 5,747,592 A * | 5/1998 | Huff et al. | 525/191 |
| 5,767,208 A | 6/1998 | Turner et al. | |
| 5,874,505 A | 2/1999 | Saito et al. | |
| 5,883,188 A | 3/1999 | Hwang et al. | |
| 5,883,204 A | 3/1999 | Spencer et al. | |
| 5,907,021 A | 5/1999 | Turner et al. | |
| 5,919,983 A | 7/1999 | Rosen et al. | |
| 5,922,822 A | 7/1999 | Wilson et al. | |
| 5,945,496 A | 8/1999 | Resconi et al. | |
| 5,962,714 A | 10/1999 | McCullough et al. | |
| 5,965,677 A | 10/1999 | Stephan et al. | |
| 5,965,756 A | 10/1999 | McAdon et al. | |
| 5,972,822 A | 10/1999 | Timmers et al. | |
| 5,977,251 A | 11/1999 | Kao et al. | |
| 5,998,039 A | 12/1999 | Tanizaki et al. | |
| 6,005,049 A | 12/1999 | Rebhan et al. | |
| 6,013,819 A | 1/2000 | Stevens et al. | |
| 6,015,868 A | 1/2000 | Nickias et al. | |
| 6,034,021 A | 3/2000 | Wilson et al. | |
| 6,034,240 A | 3/2000 | La Pointe | |
| 6,043,363 A | 3/2000 | LaPointe et al. | |
| 6,074,977 A | 6/2000 | Rosen et al. | |
| 6,103,657 A | 8/2000 | Murray | |
| 6,117,962 A | 9/2000 | Weng et al. | |
| 6,150,297 A | 11/2000 | Campbell, Jr. et al. | |
| 6,225,243 B1 | 5/2001 | Austin | |
| 6,248,829 B1 | 6/2001 | Fischer et al. | |
| 6,265,513 B1 | 7/2001 | Murray et al. | |
| 6,268,063 B1 | 7/2001 | Kaminaka et al. | |
| 6,268,444 B1 | 7/2001 | Klosin et al. | |
| 6,274,678 B1 | 8/2001 | Shinozaki et al. | |
| 6,284,857 B1 | 9/2001 | Shinozaki et al. | |
| 6,303,719 B1 | 10/2001 | Murray et al. | |
| 6,306,973 B1 | 10/2001 | Takaoka et al. | |
| 6,313,226 B1 | 11/2001 | Yasaka et al. | |
| 6,319,991 B1 | 11/2001 | Okayama et al. | |
| 6,320,002 B1 | 11/2001 | Murray et al. | |
| 6,320,005 B1 | 11/2001 | Murray | |
| 6,323,389 B1 | 11/2001 | Thomas et al. | |
| 6,326,432 B1 | 12/2001 | Fujita et al. | |
| 6,340,730 B1 | 1/2002 | Murray et al. | |
| 6,342,564 B1 | 1/2002 | Pitkanen et al. | |
| 6,342,566 B2 | 1/2002 | Burkhardt et al. | |
| 6,355,725 B2 | 3/2002 | Terano et al. | |
| 6,423,782 B1 | 7/2002 | Yukimasa et al. | |
| 6,515,155 B1 | 2/2003 | Klosin et al. | |
| 2002/0006993 A1 | 1/2002 | Shinozaki et al. | |
| 2002/0019507 A1 | 2/2002 | Karandinos et al. | |
| 2002/0035210 A1 | 3/2002 | Silvestri et al. | |
| 2002/0062011 A1 | 5/2002 | Campbell, Jr. et al. | |
| 2002/0137845 A1 | 9/2002 | Boussie et al. | |
| 2002/0142912 A1 | 10/2002 | Boussie et al. | |
| 2002/0147288 A1 | 10/2002 | Boussie et al. | |
| 2002/0151662 A1 | 10/2002 | Campbell, Jr. et al. | |
| 2002/0156279 A1 | 10/2002 | Boussie et al. | |
| 2002/0165329 A1 | 11/2002 | Klosin et al. | |
| 2002/0173419 A1 | 11/2002 | Boussie et al. | |
| 2002/0177711 A1 | 11/2002 | LaPointe et al. | |
| 2003/0004286 A1 | 1/2003 | Klosin et al. | |

FOREIGN PATENT DOCUMENTS

| | | |
|---|---|---|
| EP | 0 277 003 A1 | 8/1988 |
| EP | 0 277 004 A1 | 8/1988 |
| EP | 0 515 203 A2 | 11/1992 |
| EP | 0 515 203 A3 | 11/1992 |
| EP | 0 279 586 B1 | 4/1994 |
| EP | 0 594 218 B1 | 4/1994 |
| EP | 0 676 421 A1 | 10/1995 |
| EP | 0 520 732 B1 | 12/1995 |
| EP | 0 692 500 B1 | 1/1996 |

| | | |
|---|---|---|
| EP | 0 697 420 A1 | 2/1996 |
| EP | 0 593 083 B1 | 5/1996 |
| EP | 0 721 798 A2 | 7/1996 |
| EP | 0 728 721 A1 | 8/1996 |
| EP | 0 728 771 A1 | 8/1996 |
| EP | 0 468 651 B1 | 9/1996 |
| EP | 0 735 058 A1 | 10/1996 |
| EP | 0 468 537 B1 | 11/1996 |
| EP | 0 748 746 A2 | 12/1996 |
| EP | 0 570 982 B1 | 1/1997 |
| EP | 0 721 798 A3 | 1/1997 |
| EP | 0 495 375 B1 | 2/1997 |
| EP | 0 748 846 A3 | 2/1997 |
| EP | 0 663 422 B1 | 4/1997 |
| EP | 0663422 B1 * | 4/1997 |
| EP | 0 780 404 A2 | 6/1997 |
| EP | 0 514 828 B1 | 11/1997 |
| EP | 0 780 404 A3 | 12/1997 |
| EP | 0 699 213 B1 | 2/1998 |
| EP | 0 683 176 B1 | 3/1998 |
| EP | 0 500 944 B1 | 10/1998 |
| EP | 0 716 121 B1 | 3/1999 |
| EP | 0 628 343 B1 | 4/1999 |
| EP | 0 728 150 B1 | 6/1999 |
| EP | 0 561 476 B1 | 9/1999 |
| EP | 0 949 278 A2 | 10/1999 |
| EP | 0 949 279 A2 | 10/1999 |
| EP | 0 949 278 A3 | 9/2000 |
| EP | 0 949 279 A3 | 9/2000 |
| EP | 1 063 244 A2 | 12/2000 |
| EP | 0 728 151 B1 | 3/2001 |
| EP | 0 659 773 B2 | 12/2001 |
| WO | 88/05792 A1 | 8/1988 |
| WO | 88/05793 A1 | 8/1988 |
| WO | 90/01521 A1 | 2/1990 |
| WO | 90/07526 A1 | 7/1990 |
| WO | 93/11171 A1 | 6/1993 |
| WO | 93/18106 A1 | 9/1993 |
| WO | 93/19104 A1 | 9/1993 |
| WO | 93/21238 A2 | 10/1993 |
| WO | 93/21238 A3 | 10/1993 |
| WO | 93/21242 A1 | 10/1993 |
| WO | 93/25590 A1 | 12/1993 |
| WO | 94/00500 A1 | 1/1994 |
| WO | 94/03506 A1 | 2/1994 |
| WO | 94/10180 A1 | 5/1994 |
| WO | 94/25495 A1 | 11/1994 |
| WO | 94/25497 A1 | 11/1994 |
| WO | 94/26793 A1 | 11/1994 |
| WO | 94/28032 A1 | 12/1994 |
| WO | 94/29032 A1 | 12/1994 |
| WO | 95/00526 A1 | 1/1995 |
| WO | 95/07942 A1 | 3/1995 |
| WO | 95/13305 A1 | 5/1995 |
| WO | 95/13306 A1 | 5/1995 |
| WO | 96/00244 A1 | 1/1996 |
| WO | 96/13530 A1 | 5/1996 |
| WO | 96/23010 A2 | 8/1996 |
| WO | 97/22635 A1 | 6/1997 |
| WO | 97/25355 A1 | 7/1997 |
| WO | 97/42241 A1 | 11/1997 |
| WO | 98/41529 A1 | 9/1998 |
| WO | 98/43983 A1 | 10/1998 |
| WO | 98/50392 A1 | 11/1998 |
| WO | 99/14250 A1 | 3/1999 |
| WO | 00/01745 A1 | 1/2000 |
| WO | 00/59961 A1 | 10/2000 |
| WO | 00/69965 A1 | 11/2000 |
| WO | 01/74910 A1 | 10/2001 |
| WO | 02/38628 A2 | 5/2002 |
| WO | 03/040095 | 5/2003 |
| WO | 03/040201 | 5/2003 |
| WO | 03/040202 | 5/2003 |
| WO | 03/040233 | 5/2003 |

OTHER PUBLICATIONS

Brintzinger, Hans H., et al., *Angew. Chem. Int. Ed. Engl.*, 1995, 34, 1143-1170.
Chen, Eugene You-Xian, et al., *Chem. Rev.* 2000, 100, 1391-1434.
Coates, Geoffrey W., *Chem. Rev.* 2000, 100, 1223-1252.
Hazlitt, Lonnie G., *Journal of Applied Polymer Science: Applied Power Symposium* 45, 25-37 (1990).
Herzog, Timothy A., et al., *J. Am. Chem. Soc.* 1996, 118, 11988-11989.
News Release, Japan Polychem Launches Wintec Metallocene-Based PP Random Copolymer, Oct. 25, 2001, http:www.m-kagaku.co.jp/English/rel/2001/102501.htm.
Ittel, Steven D., et al., *Chem. Rev.* 2000, 100, 1169-1203.
*The Encyclopedia of Chemical Technology*, Kirk-Othmer, Third Edition, John Wiley & Sons, New York, 1981, vol. 18, pp. 191-192.
*The Encyclopedia of Chemical Technology*, Kirk-Othmer, Third Edition, John Wiley & Sons, New York, 1981, vol. 16, pp. 416-417.
Lambert, Joseph B., et al., *J. Chem. Soc., Chem. Commun.*, 1993, 383-384.
Mathur, Naresh c., et al., *Tetrahedron*, vol. 41, No. 8, 1509-1516, 1985.
Otocka, E.P., et al., *Macromolecules*, vol. 4, No. 4, Jul.-Aug. 1971, 507-514.
Resconi, Luigi, et al., *Chem., Rev.* 2000, 100, 1253-1345.
Scholte, Th. G., et al., *Journal of Applied Polymer Science*, vol. 29, 3763-3782, 1984.
Scollard, John D., et al., *J. Am. Chem. Soc.* 1996, 118, 10008-10009.
Veghini, Dario, et al., *J. Am. Chem. Soc.* 1999, 121, 564-573.
Wang, Chunming, et al., *Organometallics*, vol. 17, No. 15, 1998, 3149-3151.
Wild, L. et al., *Journal of Polymer Science Polymer Physics Edition*, vol. 20, 1982, 441-455.
Younkin, Todd R., et al., *Science*, vol. 287, Issue 5452, 2000, 460-462.

* cited by examiner

DSC of the propylene/ethylene copolymer of Comparative
Example 1 prepared using a metallocene catalyst.

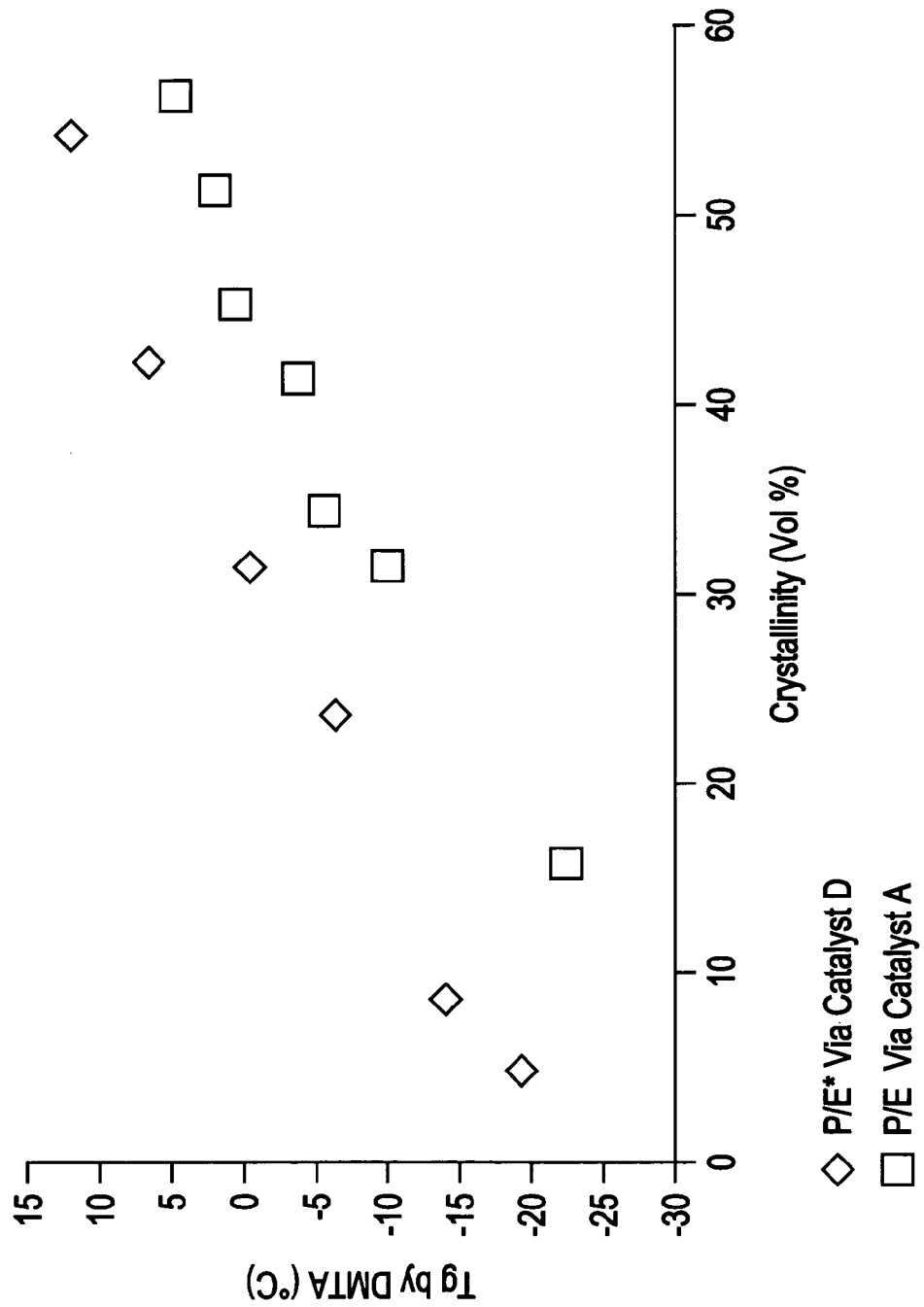

$^{13}$C NMR Spectrum of the propylene/ethylene copolymer product of Example 2, prepared using Catayst C.

jp01522.9

X : parts per Million : 13C

Expanded portion of the $^{13}$C NMR Spectrum of the propylene-ethylene copolymer product of Example 2, prepared using Catalyst C. This spectrum is shown at an expanded X- and Y-axis scale relative to Figure 4 in order to more clearly show the regioerror peaks.

FIG. 11A
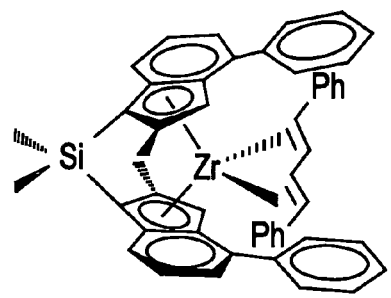
Catalyst A
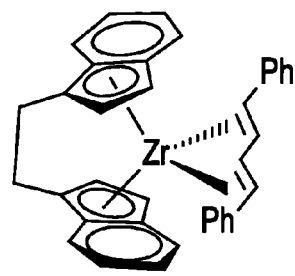
Catalyst B
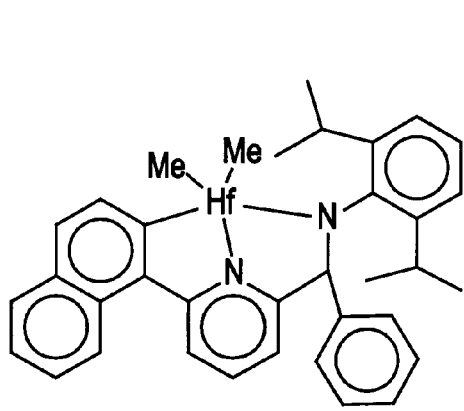
Catalyst C
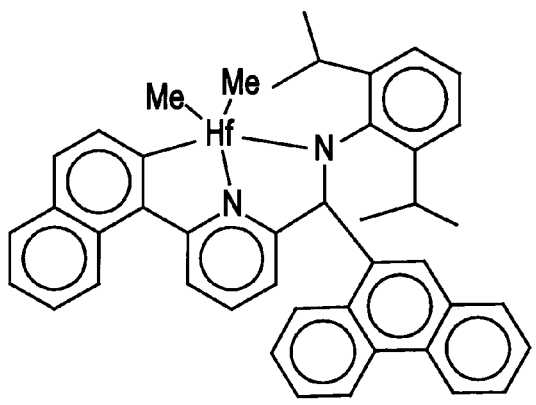
Catalyst D

FIG. 11B
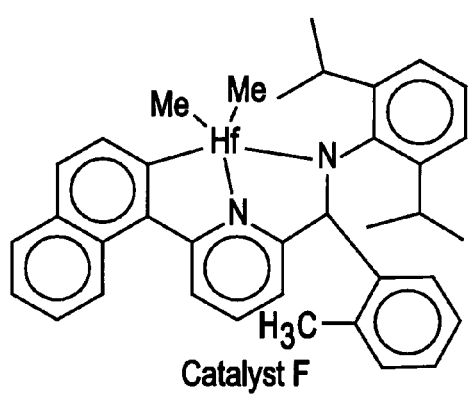
Catalyst F
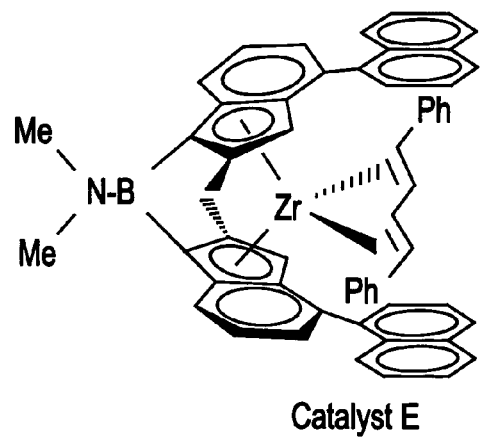
Catalyst E

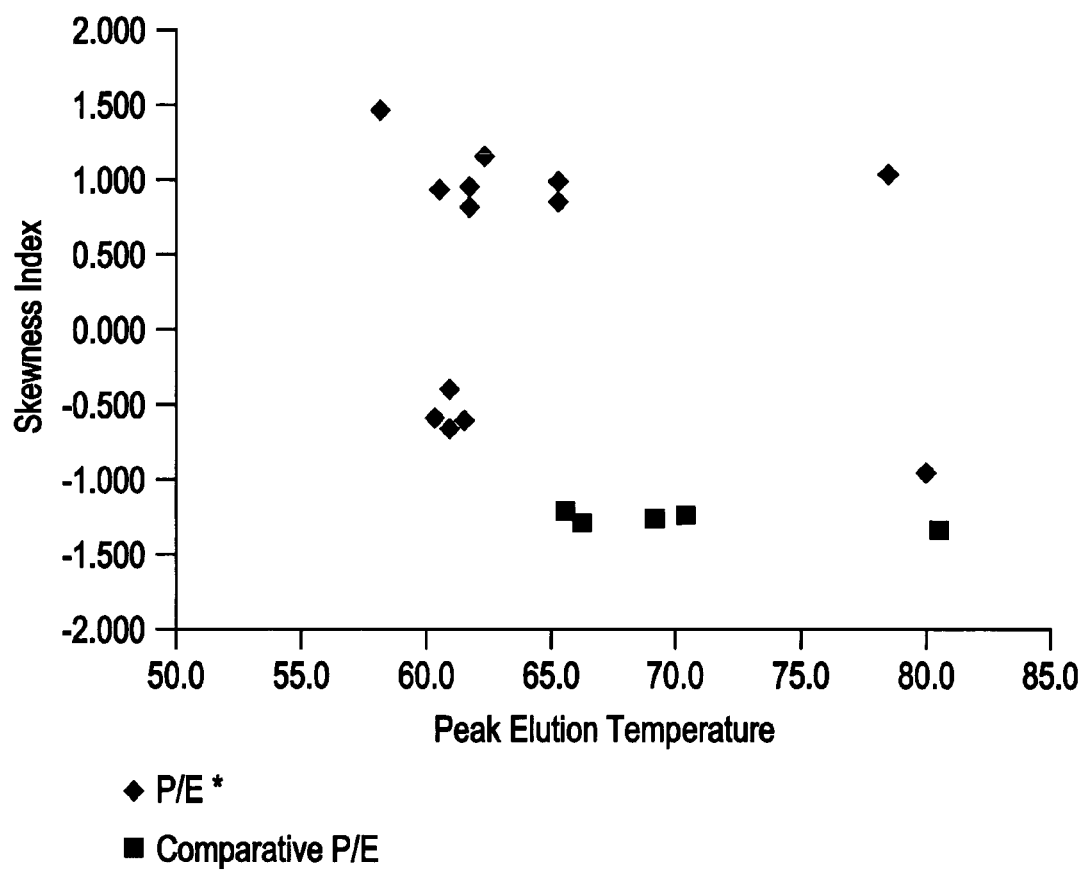

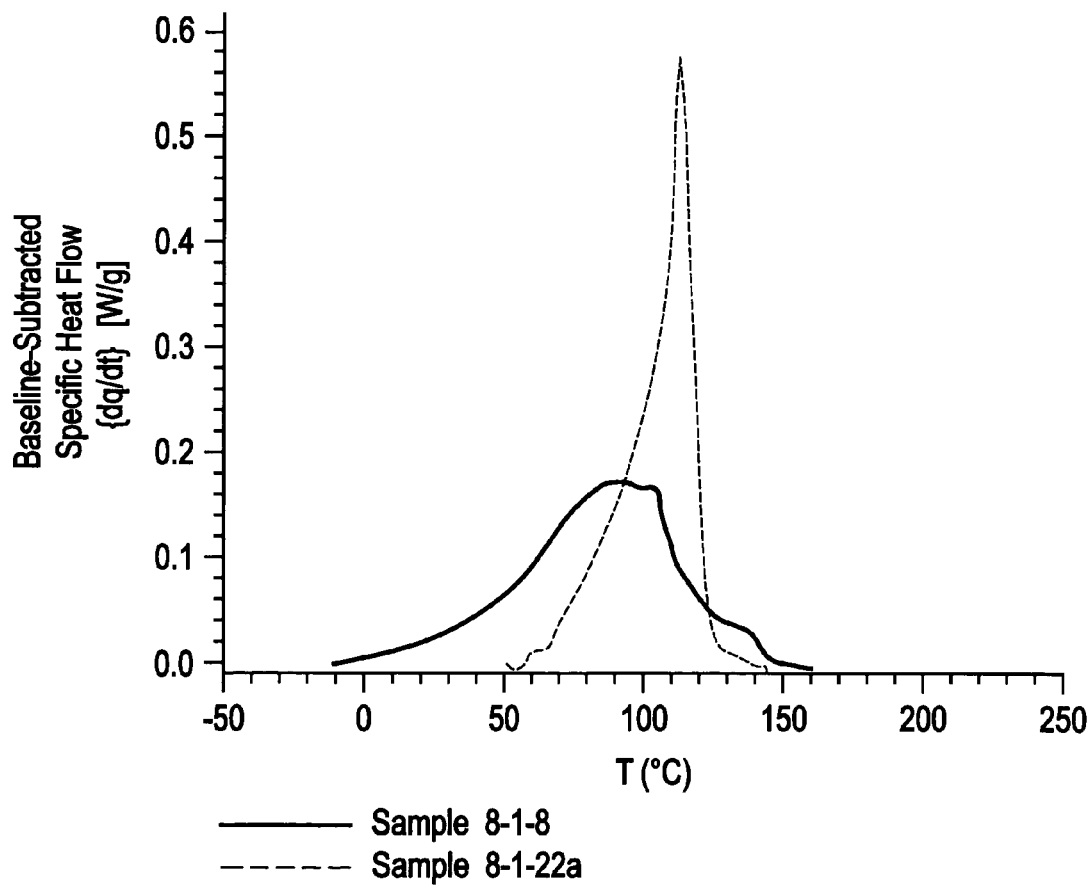

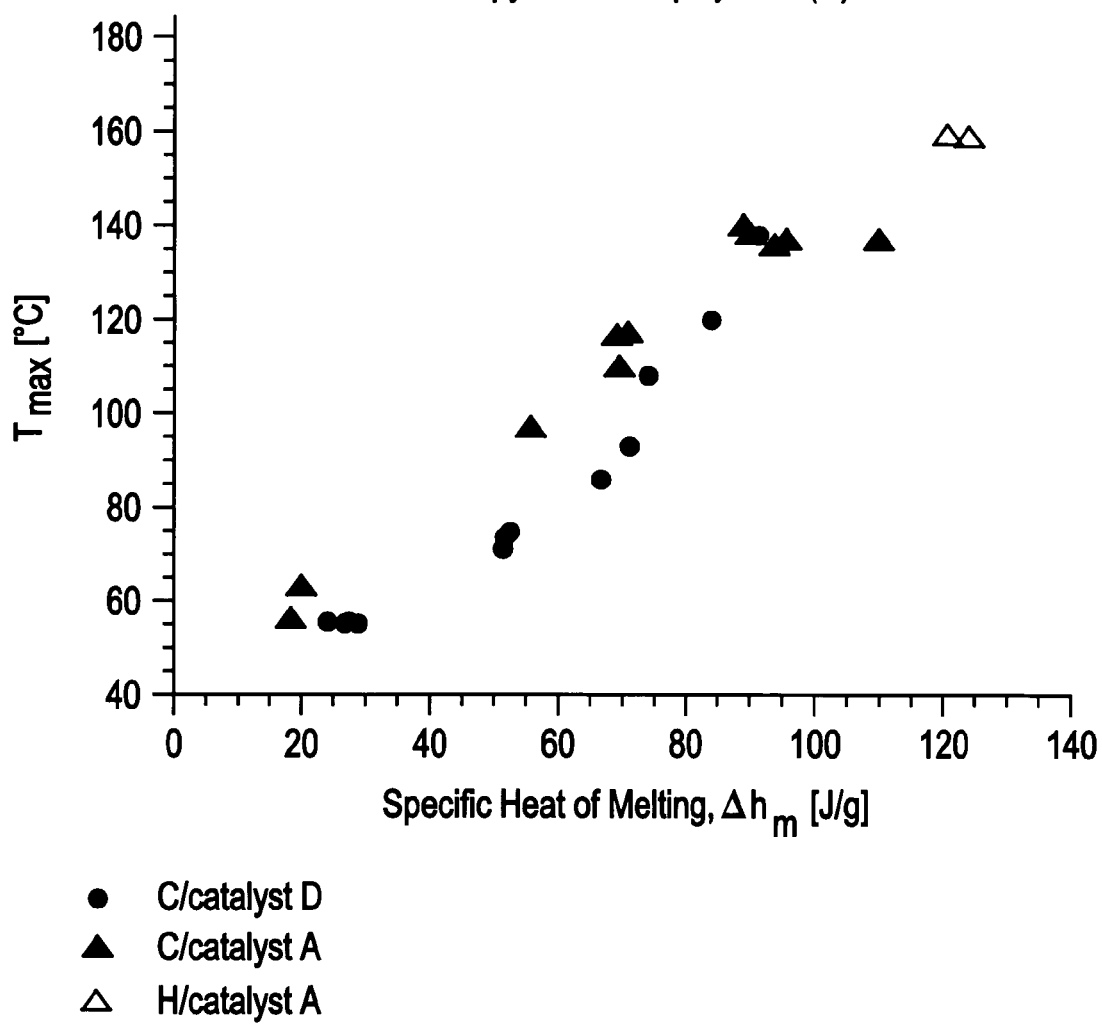

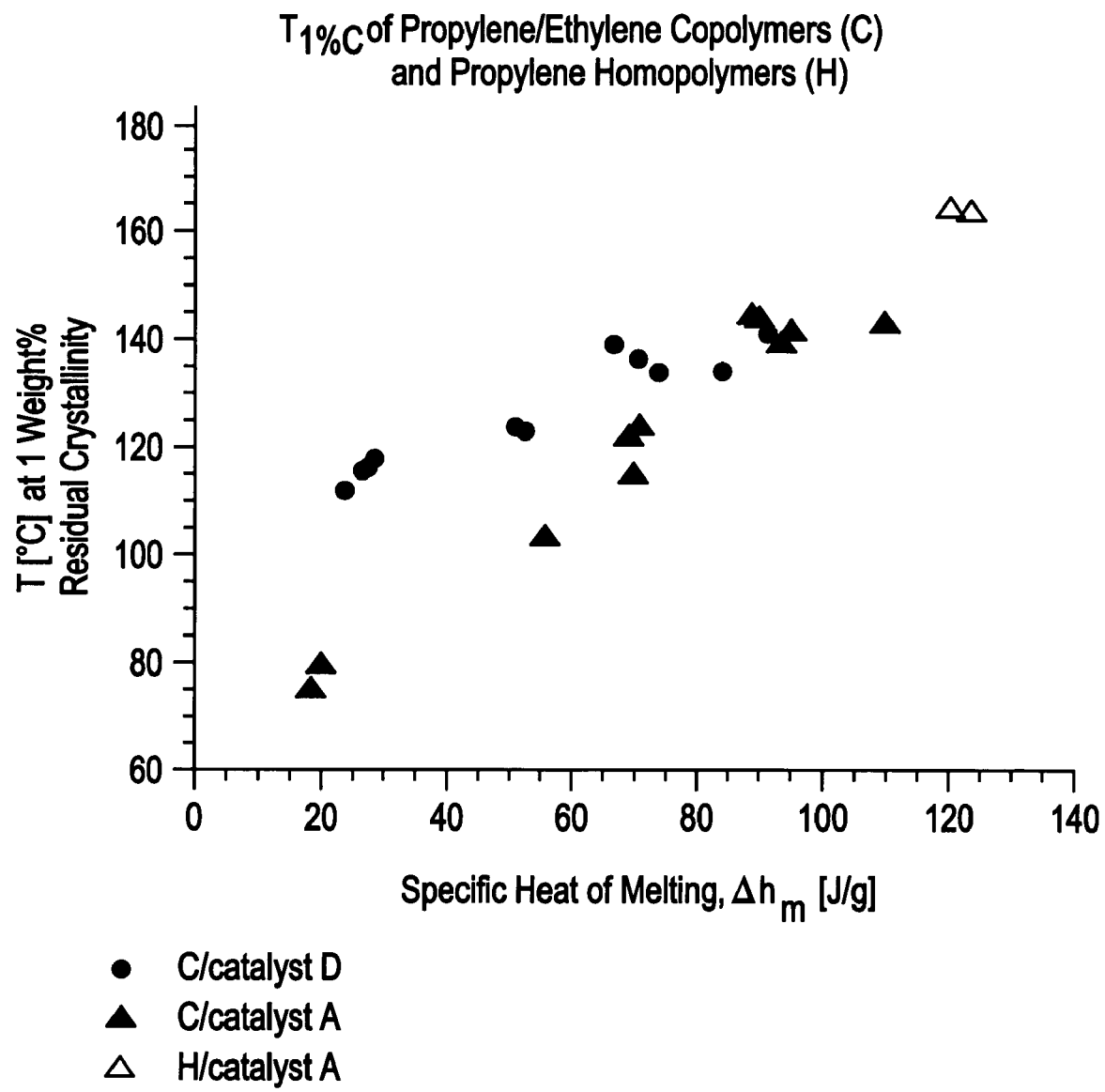

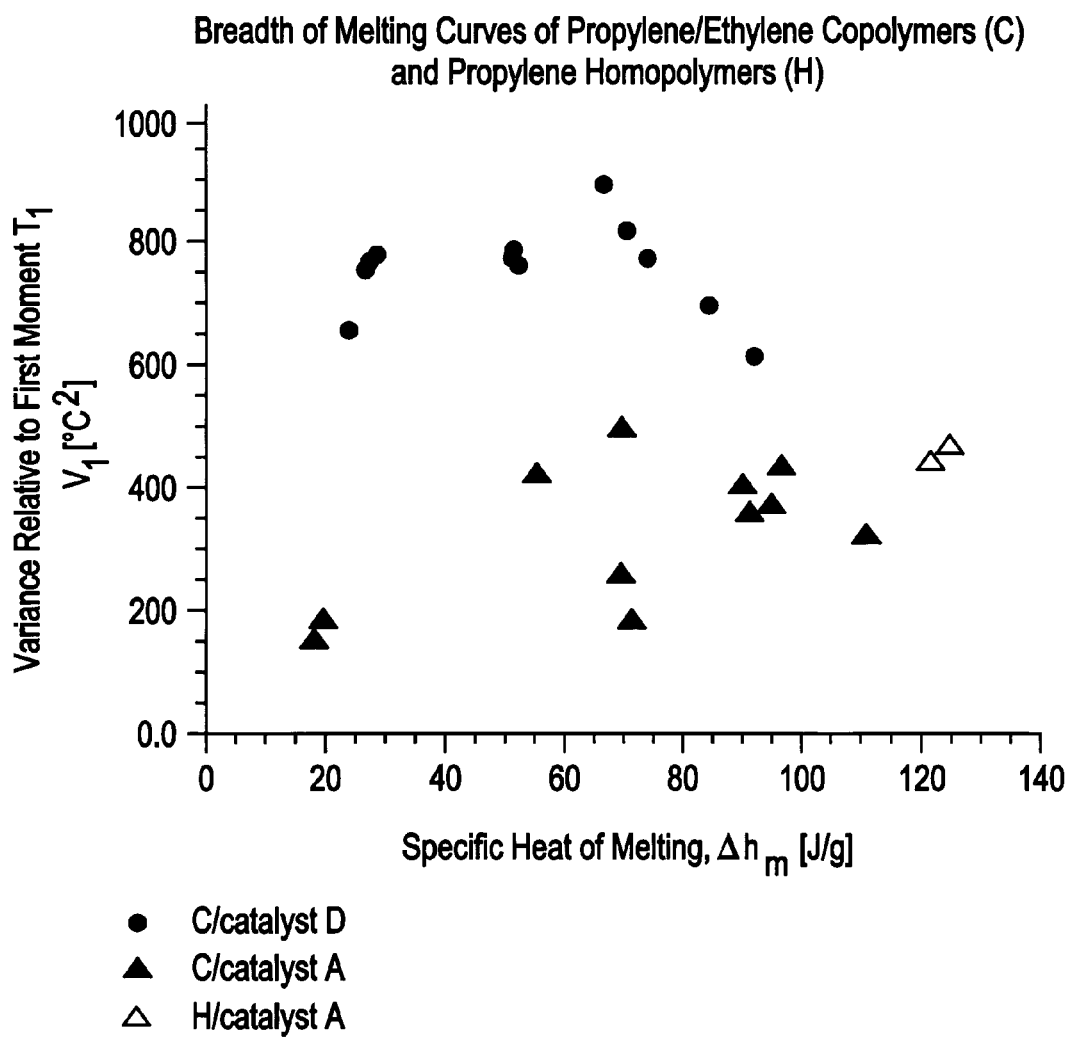

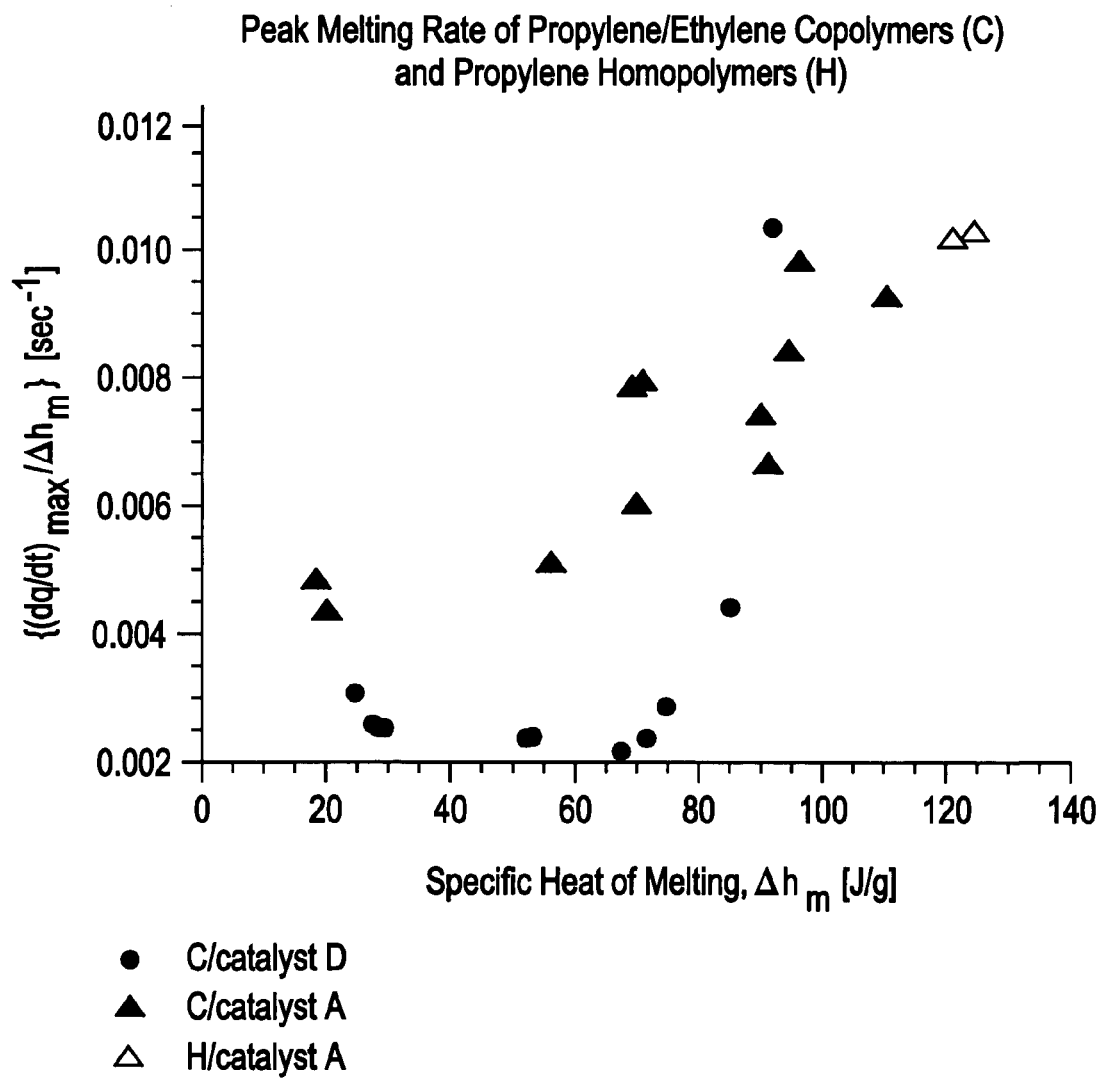

THERMOPLASTIC ELASTOMER COMPOSITIONS

FIELD

The field of this invention is flexible thermoplastic olefin blends.

BACKGROUND

Flexible thermoplastic olefin blends are used extensively in commercial applications, such as roofing membranes and geomembranes, automotive interior skins, and wall coverings. These applications typically require an excellent balance of flexibility, tensile strength, extensibility, self-hot tack, tear and puncture resistance, heat resistance, and low temperature flexibility.

Flexible thermoplastic olefin blends are typically a blend of a polypropylene with an elastomer, such as, ethylene-propylene rubber (EPR), ethylene-propylene-diene rubber (EPDM), elastomeric propylene-alpha olefin copolymers, and elastomeric ethylene-alpha olefin copolymers. The polypropylene typically provides tensile strength and heat resistance to the blend, while the elastomer provides flexibility, extensibility and good self-hot tack.

PCT publication WO 00/69965 describes thermoplastic filled membranes utilizing propylene copolymers in combination with polypropylene. The propylene copolymers disclosed in this reference have both narrow composition distributions (i.e. uniform composition distribution) and narrow molecular weight distribution. It is believed that the use of propylene copolymers having narrow composition distribution limits the heat sealability window of the blend and reduces the compatibility between the polypropylene component and the elastomer component. For purposes of this invention, the heat sealability window is described as the temperature range within which the blend will exhibit an adequate seal initiation temperature, while at the same time maintaining sufficient self-hot tack strength.

The seal initiation temperature can be lowered by increasing the relative amount of propylene-alpha olefin copolymer in the blend and/or by adding additional components such as process oils. However, these type of changes will also reduce the heat resistance, tensile strength and hot tack performance of articles made from the blend.

What is desired is a flexible thermoplastic olefin blend that exhibits an excellent balance of flexibility, tensile strength, extensibility, and has a broad heat sealability window and good heat resistance. Surprisingly, the inventors have found that a flexible thermoplastic olefin blend of (a) an isotactic polypropylene, and (b) a propylene-alpha olefin copolymer having substantially isotactic propylene sequences and exhibiting a narrow molecular weight distribution provides better physical properties, such as puncture resistance and tear, higher ultimate seal strength and tensile strength; and a broad composition distribution provides improved compatibility between the blend components, which results in an excellent balance of flexibility, heat resistance, extensibility, tensile strength, tear resistance and improved heat sealability window. It is further believed that, the use of a propylene-alpha olefin copolymer in accordance with the invention (which has a broad composition distribution in addition to a narrow MWD) allows for the development of high performance blends encompassing greater formulation flexibility and property balance with respect the compositional range of polypropylene and propylene-alpha olefin copolymers utilized.

SUMMARY

It has been surprisingly discovered that a blend of propylene-alpha olefin copolymer as described below and a polypropylene provide an improved flexible thermoplastic olefin blend having an excellent balance of physical properties.

In a first aspect the invention is a thermoplastic olefin composition having: (a) at least 40 percent by weight of a propylene-alpha olefin copolymer based on the total weight of polymers in the composition, the propylene-alpha olefin copolymer having at least 60 percent by weight units derived from propylene, at least 6 percent by weight units derived from an alpha olefin, a molecular weight distribution less than 3.5, and a broad composition distribution; and (b) at least 20 percent by weight of a polypropylene based on the total weight of polymers in the composition, the polypropylene having at least 93 percent by weight units derived from propylene, a molecular weight distribution of greater than 3.5, a heat of fusion greater than the heat of fusion exhibited by the propylene-alpha olefin copolymer, and a melting point $T_{max}$ of at least 120° C.

In a second aspect the invention is a thermoplastic olefin composition, having: (a) at least 40 percent by weight of a propylene-alpha olefin copolymer based on the total weight of polymers in the composition, the propylene-alpha olefin copolymer having at least 60 percent by weight units derived from propylene, at least 5 percent by weight units derived from an alpha olefin, a molecular weight distribution less than 3.5, and a broad composition distribution; (b) at least 20 percent by weight of a polypropylene based on the total weight of polymers in the composition, the polypropylene having at least 93 percent by weight units derived from propylene, a heat of fusion greater than the heat of fusion exhibited by the propylene-alpha olefin copolymer, and a melting point $T_{max}$ of at least 120° C.; and (c) at least 10 percent by weight of an ethylene-alpha olefin elastomer based on the total weight of polymers in the composition.

In a third aspect the invention is a thermoplastic olefin composition, having: (a) at least 40 percent by weight of a propylene-alpha olefin copolymer based on the total weight of polymers in the composition, the propylene-alpha olefin copolymer having at least 60 percent by weight units derived from propylene, at least 6 percent by weight units derived from an alpha olefin, a molecular weight distribution less than 3.5, and a broad composition distribution; and (b) at least 20 percent by weight of a propylene impact copolymer based on the total weight of polymers in the composition.

BRIEF DESCRIPTION OF THE DRAWINGS

FIG. 2 shows a comparison of the Tg data of a propylene-alpha olefin copolymer of the current invention, in particular a P/E* copolymer, and a propylene-ethylene copolymer (P/E) made using a metallocene catalyst (Catalyst A) at equivalent crystallinity.

FIGS. 11A and 11B show the chemical structures of various catalysts.

FIG. 12 shows a comparison of the skewness index for the P/E* copolymer of this invention and several P/E copolymers known in the art.

FIG. 13 compares the melting endotherms of Samples 8 and 22a of Example 8.

FIG. 14 demonstrates the shift in peak melting temperature towards lower temperatures for samples of the P/E* copolymers of this invention as described in Example 8.

FIG. 15 is a plot of the temperature at which approximately 1 percent crystallinity remains in DSC samples of Example 8.

FIG. 16 shows the variance relative to the first moment of the melting endotherm as a function of the heat of melting of various samples of Example 8.

FIG. 17 shows the maximum heat flow normalized by the heat of melting as a function of the heat of melting for various samples of Example 8.

DEFINITIONS

Figure 1A:
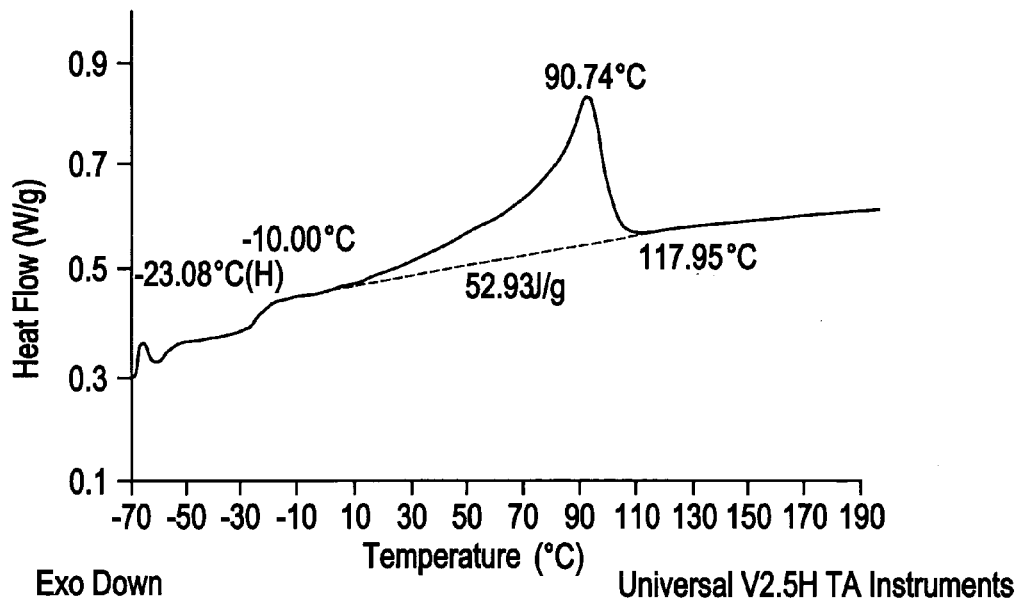
FIGS. 1A and 1B show a comparison of the DSC heating traces of the propylene/ethylene (P/E) copolymer of Comparative Example 1 and the P/E* copolymer of Example 2, respectively.

"$T_{me}$" means the temperature at which the melting ends, as determined by differential scanning calorimetry procedures set forth below.

"$T_{max}x$" means the peak melting temperature, as determined by differential scanning calorimetry procedures set forth below.

"Metallocene-catalyzed polymer" or similar term means any polymer that is made in the presence of a metallocene catalyst "Random copolymer" means a copolymer in which the comonomer is randomly distributed across the polymer chain.

"Propylene random copolymer" means a random copolymer of propylene and ethylene comprising at least sixty percent by weight units derived from propylene.

"Impact copolymer" means two or more polymers in which one polymer is dispersed in the other polymer, typically one polymer comprising a matrix phase and the other polymer comprising an elastomer phase. The matrix polymer is typically a crystalline polymer, e.g., polypropylene homopolymer or polypropylene copolymer, and the polymer comprising the elastomer phase is typically a rubber or elastomer, e.g., an EP or an EPDM rubber. The polymer that forms the elastomer phase typically comprises between about 5 and about 50, preferably between about 10 and 45 and more preferably between about 10 and 40, weight percent of the impact polymer.

"Propylene Impact Copolymer" refers to an impact copolymer where a polypropylene copolymer or propylene homopolymer forms the matrix of the impact copolymer.

"Propylene homopolymer" and similar terms mean a polymer consisting solely or essentially all of units derived from propylene.

"Polypropylene copolymer" and similar terms mean a polymer comprising units derived from propylene and ethylene and/or one or more unsaturated comonomers. The term "copolymer" includes terpolymers, tetrapolymers, etc.

"Polypropylene" means a propylene homopolymer, propylene random copolymer, a polypropylene copolymer or a propylene impact copolymer.

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication referenced herein is hereby incorporated by reference in its entirety, especially with respect to the disclosure of analytical or synthetic techniques and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "hetero" or "hetero-atom" refers to a non-carbon atom, especially Si, B, N, P or O. "Heteroaryl", "heteroalkyl", "heterocycloalkyl" and "heteroaralkyl" refer to aryl, alkyl, cycloalkyl, or aralkyl groups respectively, in which at least one carbon atom is replaced by a heteroatom. "Inertly substituted" refers to substituents on a ligand that do not destroy operability of the invention. Preferred inert substituents are halo, di($C_{1-6}$ hydrocarbyl)amino, $C_{2-6}$ hydrocarbyleneamino, $C_{1-6}$ halohydrocarbyl, and tri($C_{1-6}$ hydrocarbyl)silyl. The term "polymer", as used herein, includes both homopolymers, that is, polymers prepared from a single reactive compound, and copolymers, that is, polymers prepared by reaction of at least two polymer forming reactive, monomeric compounds.

DESCRIPTION OF THE PREFERRED EMBODIMENTS

The Blend

The flexible thermoplastic polyolefin blend of the invention comprises at least 40 percent by weight of a propylene-alpha olefin copolymer, preferably from 40 percent by weight to 80 percent by weight based on the total weight of the polymer present in the blend. The blend further comprises at least 20 percent by weight of a polypropylene, preferably at least 30 percent by weight based on the total weight of the polymer present in the blend.

The propylene-alpha olefin copolymer forms a continuous phase of the blend, either the sole continuous phase or a co-continuous phase with the polypropylene.

Optionally, the blend comprises an elastomer component other than the propylene-alpha olefin copolymer. Preferably, the elastomer component is present at a lower weight percentage than the propylene-alpha olefin copolymer. The total weight percent of the propylene-alpha olefin copolymer plus the elastomer component is preferably at least 40 percent by weight (more preferably 50 percent by weight) and preferably less than 80 percent by weight (more preferably 70 percent by weight) of the total polymer present in the blend.

The blend also can include additional components, such as, organic and inorganic fillers, polymer additions (such as antioxidants (such as hindered phenols or phosphites), light stabilizers (such as hindered amines), antiblock and slip agents, plasticizers (such as dioctylphthalate or epoxidized soy bean oil), processing aids (such as oils, stearic acid or a metal salt thereof)), colorants or pigments to the extent that they do not interfere with desired physical properties of the blend of the present invention. The additives are employed in functionally equivalent amounts known to those skilled in the art.

The flexible thermoplastic polyolefin blends of the invention exhibit an excellent balance of physical properties. The properties typically exhibited by articles formed from the flexible thermoplastic polyolefin blend include: tensile 2% secant modulus (measured in accordance with ASTM D882) less than 50,000 p.s.i., preferably less than 40,000 p.s.i., more preferably less than 30,000 p.s.i., and in some instance (such as when the propylene-alpha olefin copolymer comprises a terpolymer) less than 20,000 p.s.i., preferably less than 10,000 p.s.i.; tensile strength (measured in accordance with ASTM C412) of at least 1,000 p.s.i., preferably at least 1,500 p.s.i., more preferably at least 2,000 p.s.i., and when propylene-ethylene copolymers are the propylene-alpha olefin copolymers, preferably at least 2,500 p.s.i., more preferably at least 3,000 p.s.i., and in some instances greater than 4,000 p.s.i.; tensile elongation (as measured in accordance with ASTM C412) of at least 500%, preferably at 600% and in some instances greater than 700%; TMA of at least 100° C., preferably at least 110° C., and for some applications where heat stability is critical, preferably at least 120° C., more preferably at least 130° C.; Vicat softening temperature (as measured in accordance with ASTM D1525) of at least 40° C., preferably at least 45° C., more preferably at least 50° C., and in some instances at least 60° C., preferably at least 70° C.; a glass transition temperature Tg (as measured by DSC) of less than −10° C., preferably less than −15° C., more preferably less than −20° C.

The inventive blends disclosed herein may be made in-reactor (with single reactors having multiple polymerization steps and/or with multiple reactors (batch and/or continuous) operated in parallel or in series). Alternatively, the components of the blend can be physically admixed using equipment, such as extruders, blenders, mix tanks, banbury mixers, and other equipment and/or processes known to one of ordinary skill in the art.

The Propylene-Alpha Olefin Copolymer

The propylene-alpha olefin copolymers of this invention typically comprise units derived from propylene in an amount of at least about 60 percent by weight of the copolymer. For propylene-ethylene copolymers, the units derived from propylene is preferably at least about 80 and more preferably at least about 85 percent by weight of the copolymer. For propylene-alpha olefin copolymers, which are terpolymers, the percent by weight of units derived from propylene preferably is at least 65 percent by weight, more preferably at least 70 percent by weight. The typical amount of units derived from alpha olefin (preferably ethylene) in propylene-alpha olefin copolymers is at least 8, preferably at least 10 and more preferably at least 12 percent by weight. If a terpolymer is utilized, the combined total amount of units derived from the comonomers preferably is from 10 to 35 percent by weight. The maximum amount of units derived from alpha olefin present in these copolymers is typically not in excess of 40, preferably not in excess of 35, more preferably not in excess of 30, and further more preferably not in excess of 25 percent by weight of the copolymer. Preferably, for propylene-ethylene copolymers, the amount of units derived from ethylene is from 6 to 20 percent by weight, more preferably from 8 to 17 percent by weight, further more preferably from 10 to 15 percent by weight.

For the purposes of this application, alpha olefin includes $C_{8-40}$ vinyl aromatic compounds including sytrene, o-, m-, and p-methylstyrene and the like. Preferably, the alpha olefins comprise ethylene and $C_{4-20}$ olefins, more preferably ethylene and $C_{4-12}$ olefins, most preferably ethylene.

In addition to the propylene and alpha olefin, the copolymers may also contain other unsaturated comonomers. The other unsaturated comonomers which may be incorporated into the propylene-alpha olefin copolymer include, but are not limited to: $C_{4-20}$ diolefins, preferably 1,3-butadiene, 1,3-pentadiene, norbornadiene, 5-ethylidene-2-norbornene (ENB) and dicyclopentadiene, divinylbenzene, vinylbiphenyl, vinylnapthalene; and halogen-substituted $C_{8-40}$ vinyl aromatic compounds such as chlorostyrene and fluorostyrene.

The propylene-alpha olefin copolymers of this invention of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Molecular Weight

The weight average molecular weight (Mw) of the propylene-alpha olefin copolymers of this invention typically is between about 850,000 to 165,000.

Melt Flow Rate (MFR)

The propylene copolymers of this invention typically have an MFR of at least 0.1, preferably at least 0.3, more preferably at least 0.5, further more preferably at least 1, and most preferably at least 1.5. The maximum MFR typically does not exceed 100, preferably does not exceed about 50, more preferably it does not exceed about 40, and further more preferably it does not exceed about 30. MFR for polypropylene and the propylene-alpha olefin copolymers of this invention are measured according to ASTM D-1238, condition L (2.16 kg, 230 degrees C.).

Molecular Weight Distribution

The molecular weight distribution (MWD) is the ratio ($M_w/M_n$) of weight average molecular weight ($M_w$) to number average molecular weight ($M_n$). The Mw/Mn of the propylene-alpha olefin copolymers of the inventive blend are less than about 3.5, preferably less than about 3.0, more preferably less than about 2.8, more preferably less than about 2.5, and most preferably less than about 2.3. Molecular weight distribution for all the polymers of the invention are determined in accordance with the description provided below.

Gel Permeation Chromatography

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PS1 ranging from 580-7,500,000 g/mole) in conjunction with their elution volumes. The equivalent molecular weights for the polymer of interest are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N.Y. Hellman, P. M. Muglia, Macromolecules, 4, 507 (1971)) in the Mark-Houwink equation:

$$\{N\}=KM^a$$

where $K_{pp}=1.90E-04$, $a_{pp}=0.725$ and $K_{ps}=1.26E-04$, $a_{ps}=0.702$.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of polymeric Materials*, Academic Press, 1981).

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The selected polypropylene or propylene-alpha olefin samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Subsequently the sample is heated at a rate of 10° C./min until complete melting. The resulting enthalpy curves are analyzed for peak melt temperature ($T_{max}$), onset and peak crystallization temperatures, heat of fusion and heat of crystallization, $T_{me}$, and any other DSC analyses of interest.

Tables A and B below show several physical properties for exemplary propylene-alpha olefin copolymers of the invention as compared to propylene-alpha olefin copolymers made with metallocene catalysts. All the copolymers are propylene-ethylene copolymers. The metallocene propylene-ethylene copolymer is designated P/E and are sometimes referred to hereinafter as P/E and/or P/E Copolymers. The propylene-ethylene copolymers made with Catalysts C, D, and F are designated P/E* and are sometimes referred to hereinafter as P/E* and/or P/E* Copolymers. The propylene-alpha olefin copolymers of the current invention preferably have a heat of fusion (Hf) of less than 50 Joules/gram, more preferably less than 40 Joules/gram, further more preferably less than 35 Joules/gram, and for blends exhibiting excellent flexibility, less than 30 Joules/gram and/or preferably show regio-errors at 14 and 16 ppm (as more fully-described below in the $^{13}$C NMR section). B-5 and B-6 from Table B show that at high comonomer levels, there is very little crystallinity in the polymer and the regio-errors may not be readily discernable.

TABLE A

Physical Properties for Selected Propylene-Ethylene Copolymers

| Number | Description | MFR (g/10 min) | Density (kg/dm 3#) | Ethylene (mol %) | Regio-errors 14-16 ppm (mole %) (average of two) | Tmax (° C.) | Cryst. (%) (from Hf) | Tg (° C.) |
|---|---|---|---|---|---|---|---|---|
| A-1 | P/E via Catalyst E | 25.8 | 0.8864 | 10.6 | 0.00 | 104.7 | 37.3 | −20.9 |
| A-2 | P/E* via Catalyst C | 1.7 | 0.8740 | 11.8 | 0.24 | 63.3 | 24.4 | −23.6 |
| A-3 | P/E* via Catalyst C | 1.5 | 0.8703 | 12.9 | 0.32 | 57.7 | 21.9 | −24.5 |
| A-4 | P/E* via Catalyst D | 2.3 | 0.8741 | 11.8 | 0.34 | 67.9 | 27.4 | −23.7 |
| A-5 | P/E* via Catalyst D | 2 | 0.8648 | 15.8 | 0.24 | 53.7 | 10.5 | −27.6 |

TABLE A-continued

Physical Properties for Selected Propylene-Ethylene Copolymers

| Number | Description | MFR (g/10 min) | Density (kg/dm 3#) | Ethylene (mol %) | Regio-errors 14-16 ppm (mole %) (average of two) | Tmax (° C.) | Cryst. (%) (from Hf) | Tg (° C.) |
|---|---|---|---|---|---|---|---|---|
| A-6 | P/E* via Catalyst D | 2.0 | 0.8581 | 18.6 | 0.18 | None | 2.6 | −29.9 |
| A-7 | P/E* via Catalyst D | 2.2 | 0.8850 | 8.2 | 0.47 | 96.0 | 40.5 | −19.3 |

Catalyst E is dimethyleamidoborane-bis-$\eta^5$-(2-methyl-4-napthylinden-1-yl)zirconium $\eta^4$-1,4,-dipheny-1,3-butadiene.

TABLE B

Physical Properties of Selected Propylene-Ethylene Copolymers

| Number | Description | MFR (g/10 min) | Density (kg/dm3) | Ethylene (mol %) | Regio-errors 14-16 ppm (mole %) (average of two) | Tmax (° C.) | Cryst. (%) (from Hf) | Tg (° C.) |
|---|---|---|---|---|---|---|---|---|
| B-1 | P/E* via Catalyst D | 1.9 | | 12.3 | 0.31 | 74.7 | 30.7 | −22.5 |
| B-2 | P/E* via Catalyst D | 25.5 | | 14.8 | 0.21 | 90.6 | 31.2 | −22.9 |
| B-3 | P/E* via Catalyst D | 25.7 | | 12.4 | 0.31 | 67.4 | 20.8 | −26.8 |
| B-4 | P/E* via Catalyst D | 52.2 | | 14.7 | 0.30 | 78.1 | 19.9 | −25.9 |
| B-5 | P/E* via Catalyst D | 27.0 | | 33.7 | 0.00 | None | 0.0 | −39.2 |
| B-6 | P/E* via Catalyst D | 76.0 | | 31.3 | 0.00 | None | 0.0 | −39.2 |
| B-7 | P/E* via Catalyst F | | | 12.0 | 0.25 | 72.4 | 33.2 | −22.8 |
| B-8 | P/E* via Catalyst F | | | 8.9 | 0.37 | 91.4 | 40.1 | −19.8 |
| B-9 | P/E* via Catalyst F | | | 8.5 | 0.44 | 101.7 | 38.7 | −20.0 |
| B-10 | P/E* via Catalyst F | | | 8.6 | 0.33 | 104.4 | 41.0 | −19.5 |
| B-11 | P/E* via Catalyst F | | | 9.6 | 0.35 | 85.5 | 38.1 | −20.6 |
| B-12 | P/E* via Catalyst F | | | 8.6 | 0.37 | 104.1 | 41.8 | −19.6 |
| B-13 | P/E* via Catalyst F | | | 8.6 | 0.34 | 90.8 | 40.8 | −19.6 |
| B-14 | P/E* via Catalyst F | | | 8.6 | 0.40 | 93.3 | 41.9 | −19.2 |
| B-15 | P/E* via Catalyst D | 1.7 | | 7.7 | 0.38 | 105.6 | 38.9 | −18.5 |
| B-16 | P/E* via Catalyst D | 27.0 | | 7.8 | 0.41 | 107.7 | 39.6 | −18.2 |

Figure 1B:
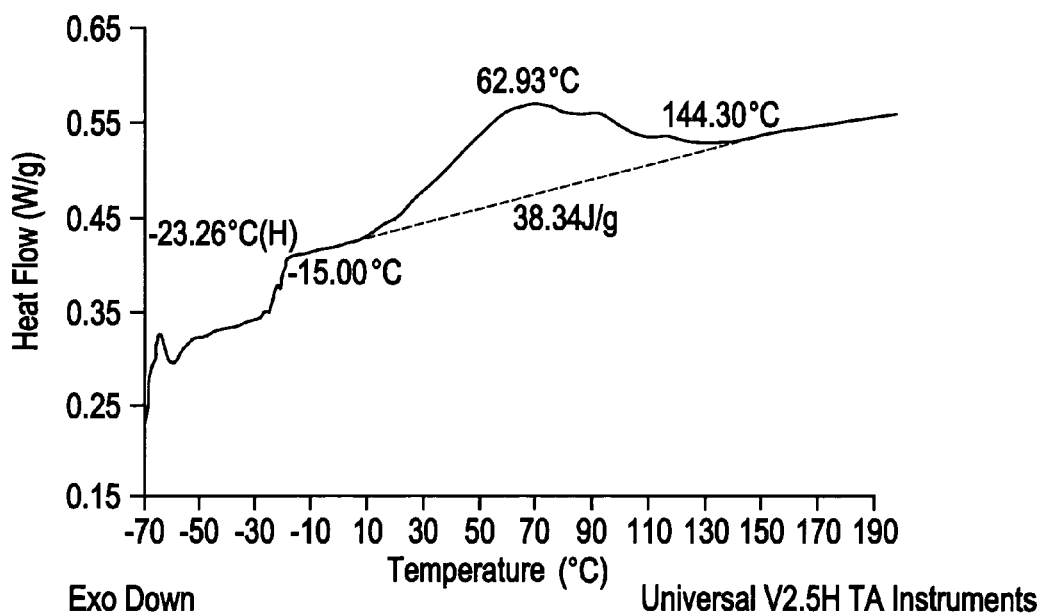

The Propylene-alpha olefin copolymers of the current invention exhibit broad melting points in the DSC heating curve. While not wishing to be held to any particular theory of operation, it is believed that this broad melting behavior is the result of a broad composition distribution (i.e. non-uniform). In FIGS. 1A and 1B, for example, a relatively narrow melting peak is observed for a propylene/ethylene copolymer prepared using a metallocene catalyst as a comparative example (Comparative Example 1), while the melting peak for a similar copolymer of propylene and ethylene meeting the requirements of the propylene-alpha olefin copolymer of the current invention exhibits a relatively broader melting behavior. Such broad melting behavior is useful for providing a relatively low heat seal initiation temperature and a broad hot tack and/or heat sealability window.

Thermal Properties

FIG. 2 further illustrate the thermal properties of the propylene-alpha olefin copolymers of this invention. In particular, FIG. 2 illustrates that propylene-ethylene copolymers of this invention have a higher glass transition temperature (Tg) than do comparable metallocene-catalysed propylene polymers at a equivalent crystallinity. This means that propylene-alpha olefin copolymers of the invention, such as the propylene-ethylene copolymers depicted, are likely to exhibit better creep resistance than metallocene-catalyzed propylene copolymers.

Broad Composition Distribution

The determination of crystallizable sequence length distribution can be accomplished on a preparative scale by temperature-rising elution fractionation (TREF). The relative mass of individual fractions can be used as a basis for estimating a more continuous distribution. L. Wild, et al., *Journal of Polymer Science: Polymer. Physics Ed.*, 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. The following table is a summary of conditions used for the analysis of copolymers of propylene. Except as noted the conditions for TREF are consistent with those of Wild, et al., ibid, and Hazlitt, *Journal of Applied Polymer Science Appl. Polym. Symp.*, 45, 25 (1990).

TABLE C

Parameters Used for TREF

| Parameter | Explanation |
| --- | --- |
| Column type and size | Stainless steel shot with 1.5 cc interstitial volume |
| Mass detector | Single beam infrared detector at 2920 cm$^{-1}$ |
| Injection temperature | 150° C. |
| Temperature control device | GC oven |
| Solvent | 1,2,4-trichlorobenzene |
| Concentration | 0.1 to 0.3% (weight/weight) |
| Cooling Rate 1 | 140° C. to 120° C. @ −6.0° C./min. |
| Cooling Rate 2 | 120° C. to 44.5° C. @ −0.1° C./min. |
| Cooling Rate 3 | 44.5° C. to 20° C. @ −0.3° C./min. |
| Heating Rate | 20° C. to 140° C. @ 1.8° C./min. |
| Data acquisition rate | 12/min. |

Figure 3:
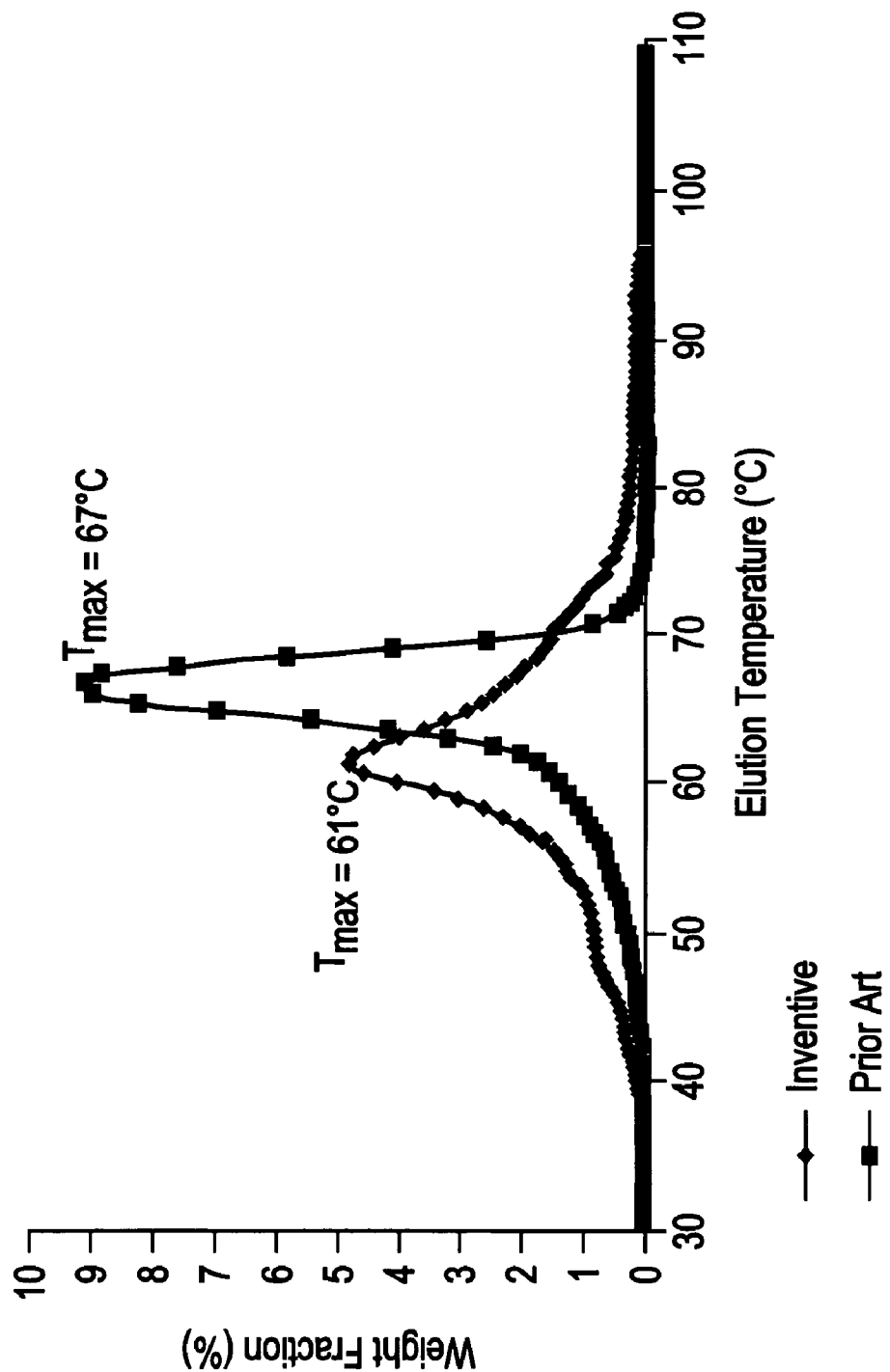
FIG. 3 shows a comparison of a TREF curve for a metallocene catalyzed P/E copolymer and a P/E* copolymer of this invention.

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature. FIG. 3 is a representation of the typical type of distribution one would expect for a propylene-ethylene copolymer made with a metallocene polymer and an example of the distribution of a propylene-alpha olefin copolymer (in particular an P/E* copolymer) of the current invention.

The shape of the metallocene curve in FIG. 3 is typical for a homogeneous copolymer. The shape arises from the inherent, random incorporation of comonomer. A prominent characteristic of the shape of the curve is the tailing at lower elution temperature compared to the sharpness or steepness of the curve at the higher elution temperatures. A statistic that reflects this type of assymetry is skewness. Equation 1 mathematically represents the skewness index, $S_{ix}$, as a measure of this asymmetry.

$$S_{ix} = \frac{\sqrt[3]{\sum w_i * (T_i - T_{\text{Max}})^3}}{\sqrt{\sum w_i * (T_i - T_{\text{Max}})^2}}. \quad \text{Equation 1}$$

The value, $T_{Max}$, is defined as the temperature of the largest weight fraction eluting between 50 and 90° C. in the TREF curve. $T_i$ and $w_i$ are the elution temperature and weight fraction respectively of an abitrary, $i^{th}$ fraction in the TREF distribution. The distributions have been normalized (the sum of the $w_i$ equals 100%) with respect to the total area of the curve eluting above 30° C. Thus, the index reflects only the shape of the crystallized polymer and any uncrystallized polymer (polymer still in solution at or below 30° C.) has been omitted from the calculation shown in Equation 1.

In addition to the skewness index, another measure of the breadth of the TREF curve (and therefore a measure of the breadth of the composition distribution of a copolymer is the Median Elution Temperature of the final eluting quartile ($T_{M4}$). The Median Elution Temperature is the median elution temperature of the 25% weight fraction of the TREF distribution (the polymer still in solution at or below 30° C. is excluded from the calculation as discussed above for skewness index) that elutes last or at the highest temperatures. The Upper Temperature Quartile Range ($T_{M4}$-$T_{Max}$) defines the difference between the Median Elution Temperature of the final eluting quartile and the peak temperature $T_{Max}$. Referring to Table 7, the comparative copolymers made with a metallocene catalyst exhibit an Upper Temperature Quartile Range of from 1.5° C. to 4.0° C., with the majority being less than 3° C. The propylene-alpha olefin copolymers of our current invention have broad composition distributions indicated in part by an Upper Temperature Quartile Range of greater than 4.0° C., preferably at least 4.5° C., more preferably at least 5° C., further more preferably at least 6° C., most preferably at least 7° C., and in some instances, at least 8° C. and even at least 9° C. In general, the higher the value for the Upper Temperature Quartile Range, the broader the composition distribution of the copolymer.

$^{13}$C NMR

The propylene-alpha olefin copolymers of this invention are further characterized as having substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well known in the art and are described in, for example, U.S. Pat. No. 5,504,172 and WO 00/01745 which refer to the isotactic sequence in terms of a triad unit in the copolymer molecular chain determined by $^{13}$C NMR spectra. NMR spectra are determined as follows.

$^{13}$C NMR spectroscopy is one of a number of techniques known in the art of measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^1$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50150 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm.

For propylene/ethylene copolymers, the following procedure is used to calculate the percent ethylene in the polymer. Integral regions are determined as follows:

TABLE D

Integral Regions for Determining % Ethylene

| Region designation | Ppm |
|---|---|
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |
| H | 24-26 |
| I | 19-23 |

Region D is calculated as $D = P \times (G \times Q)/2$. Region $E = R + Q + (G \times Q)/2$.

TABLE E

Calculation of Region D $PPP = (F + A - 0.5 D)/2$
$PPE = D$
$EPE = C$
$EEE = (E - 0.5 G)/2$
$PEE = G$
$PEP = H$
Moles P = sum P centered triads
Moles E = sum E centered triads
Moles $P = (B + 2A)/2$
Moles $E = (E + G + 0.5B + H)/2$ C2 values are calculated as the average of the two methods above (triad summation and algebraic) although the two do not usually vary.

The mole fraction of propylene insertions resulting in regio-errors is calculated as one half of the sum of the two of methyls showing up at 14.6 and 15.7 ppm divided by the total methyls at 14-22 ppm attributable to propylene. The mole percent of the regio-error peaks is the mole fraction times 100.

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

The $^{13}C$ NMR peaks corresponding to a regio-error at about 14.6 and about 15.7 ppm are believed to be the result of stereoselective 2,1-insertion errors of propylene units into the growing polymer chain. In a typical polymer of this invention, these peaks are of about equal intensity, and they represent about 0.02 to about 7 mole percent of the propylene insertions into the homopolymer or copolymer chain. For some embodiments of this invention, they represent about 0.005 to about 20 mole % or more of the propylene insertions. In general, higher levels of regio-errors lead to a lowering of the melting point and the modulus of the polymer, while lower levels lead to a higher melting point and a higher modulus of the polymer.

While not wanting to be limited to thereby or to any theory of operation, it is believed that the relatively high levels of regio-errors present in the propylene-alpha olefin copolymer of the invention results in more flexible and resilient blends. It should be appreciated that the nature and level of comonomers other than propylene also control the melting point and modulus of the copolymer. The level of regio-errors can be controlled by several means, including the polymerization temperature, the concentration of propylene and other monomers in the process, the type of (co)monomers, and other factors. Various individual catalyst structures may inherently produce more or less regio-errors than other catalysts. For example, in Table A above, the propylene homopolymer prepared with Catalyst C has a higher level of regio-errors and a lower melting point than the propylene homopolymer prepared with Catalyst D, which has a higher melting point. Preferably, the propylene-alpha olefin copolymer of the invention has more regio-errors than about 3 mole % of the propylene insertions, more preferably more than about 5 mole % of the propylene insertions, still more preferably more than about 6 mole % of the propylene insertions, and most preferably more than about 10 mole % of the propylene insertions. The regio-errors may comprise threo, erythro or a combination thereof. Preferably, the majority of the regio-errors result from threo errors.

It should be appreciated by the skilled artisan that the mole % of regio-errors for an inventive polymer which is a component of a blend refers to the mole % of regio-errors of the particular inventive polymer component of the blend that is the particular inventive polymer, and not as a mole % of the overall blend.

Exemplary Catalysts

Following are described exemplary catalysts that may be used to manufacture the propylene-alpha olefin copolymers of the invention. The invention is not intended to be limited to propylene-alpha olefin copolymers made using the preferred catalysts described below and is intended to include any propylene-alpha olefin copolymer exhibiting the properties described above and as claimed herein.

The preferred catalysts include a Group 4 metal complex for use as a catalyst component of an addition polymerization catalyst composition, said metal complex corresponding to the formula:

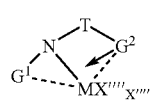

(IA)

wherein $G^1$ is selected from alkyl, cycloalkyl, aryl, aralkyl, alkaryl, heteroalkyl, heterocycloalkyl, heteroaryl, heteroaralkyl, heteroalkaryl, silyl, and inertly substituted derivatives thereof containing from 1 to 30 atoms not counting hydrogen, preferably a di-ortho-alkyl-substituted aryl, most preferably 2,6-diisopropylphenyl;

T is a divalent bridging group of from 10 to 30 atoms not counting hydrogen, selected from mono- or di-aryl-substituted methylene or silylene groups or mono- or di-heteroaryl-substituted methylene or silylene groups, wherein preferably, for high temperature polymerization conditions, at least one such aryl- or heteroaryl-substituent is substituted in one or both ortho-positions with a secondary or tertiary alkyl-group, a secondary or tertiary heteroalkyl group, a cycloalkyl group, or a heterocycloalkyl group, $G^2$ is a $C_{6-20}$ heteroaryl group containing Lewis base functionality, especially a pyridin-2-yl- or substituted pyridin-2-yl group, M is the Group 4 metal, preferably hafnium, X'''' is an anionic, neutral or dianionic ligand group, x'''' is a number from 0 to 5 indicating the number of X'''' groups, and bonds, optional bonds and electron donative interactions are represented by lines, dotted lines and arrows respectively.

Additional components of such polymerization catalyst composition may include an activator capable of converting said metal complex into an active catalyst for addition polymerization, a carrier or support, a liquid solvent or diluent, a tertiary component such as a scavenger, and/or one or more additives or adjuvants such as processing aids, sequestrants, and/or chain transfer agents.

Preferred metal complexes are those resulting from hydrogen elimination from the amine group, and optionally from the loss of one or more additional groups, especially from $G^2$, in polyfunctional Lewis base compounds of the following formula I:

$$G^1\text{-}\underset{..}{N}\text{-}T\text{-}G^2 \qquad (I)$$

wherein $G^1$, T and $G^2$ are as previously defined for formula IA, upon reaction thereof with a Group 4 metal compound. Electron donation from the Lewis basic, heteroaryl functionality, $G^2$, preferably an electron pair, provides additional stability to the metal center of the metal complexes of formula IA.

Preferred examples of the foregoing polyfunctional Lewis base compounds and the resulting metal complexes correspond to the formulas:

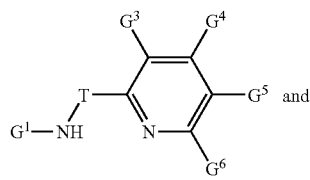

(II)

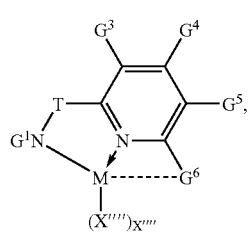

(IIA)

wherein

M, X'''', x'''', $G^1$ and T are as previously defined, $G^3$, $G^4$, $G^5$ and $G^6$ are hydrogen, halo, or an alkyl, aryl, aralkyl, cycloalkyl, or silyl group, or a substituted alkyl-, aryl-, aralkyl-, cycloalkyl-, or silyl-group of up to 20 atoms not counting hydrogen, or adjacent $G^3$, $G^4$, $G^5$ or $G^6$ groups may be joined together thereby forming fused ring derivatives, and bonds, optional bonds and electron pair donative interactions are represented by lines, dotted lines and arrows respectively.

More preferred examples of the foregoing difunctional Lewis base compounds and metal complexes correspond to the formula:

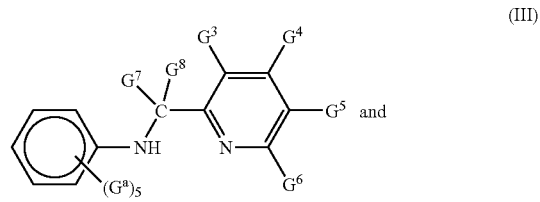

(III)

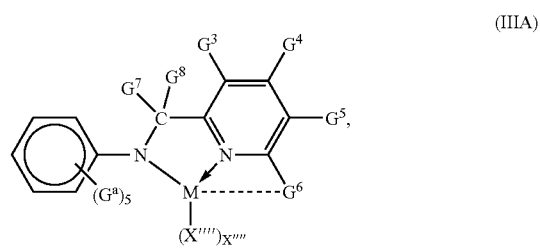

(IIIA)

wherein

M, X'''', and x'''' are as previously defined, $G^3$, $G^4$, and $G^5$ are as previously defined, preferably hydrogen or $C_{1-4}$ alkyl;

$G^6$ is $C_{6-20}$ aryl, aralkyl, alkaryl, or a divalent derivative thereof, most preferably naphthalenyl;

$G^a$ independently each occurrence is hydrogen, halo or $C_{1-20}$ alkyl, more preferably at least 2 of said $G^a$ groups are $C_{1-20}$ alkyl groups bonded through a secondary or tertiary carbon atom and located in the two ortho-positions of the phenyl ring, most preferably both such $G^a$ groups are isopropyl groups located in the two ortho-positions of the phenyl ring;

$G^7$ and $G^8$ independently each occurrence are hydrogen or a $C_{1-30}$ alkyl, aryl, aralkyl, heteroalkyl, heteroaryl, or heteroaralkyl group, with the proviso that preferably, for high temperature polymerization conditions, at least one of $G^7$ or $G^8$ is a $C_{10-30}$ aryl or heteroaryl group substituted in one or both ortho-positions with a secondary or tertiary alkyl- or cycloalkyl-ligand, most preferably one of $G^7$ and $G^8$ is hydrogen and the other is a phenyl, pyridinyl, naphthyl or anthracenyl group substituted at one or both of the ortho-positions (where possible) with an isopropyl, t-butyl, cyclopentyl, or cyclohexyl group, and bonds, optional bonds and electron pair donative interactions are represented by lines, dotted lines and arrows respectively.

Highly preferred polyfunctional Lewis base compounds and metal complexes for use herein correspond to the formula:

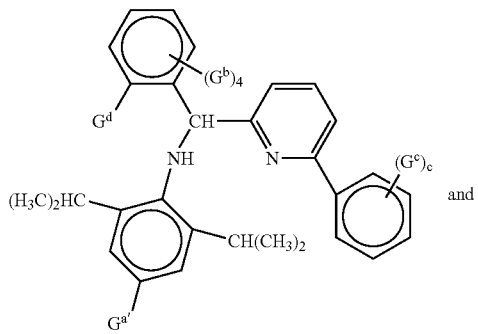

(IV)

and

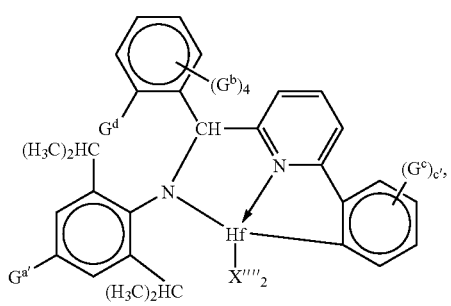

(IVA)

wherein X"" each occurrence is halide, N,N-di($C_{1-4}$alkyl)amido, $C_{7-10}$ aralkyl, $C_{1-20}$ alkyl, $C_{5-20}$ cycloalkyl, or tri($C_{1-4}$)alkylsilyl; a tri($C_{1-4}$)alkylsilyl-substituted $C_{1-10}$ hydrocarbyl group; or two X"" groups together are a $C_{4-40}$ conjugated diene, and preferably each occurrence X"" is methyl, benzyl or tri(methyl)silylmethyl;

$G^{a'}$ is hydrogen, $C_{1-4}$ alkyl or chloro;

$G^b$ independently each occurrence is hydrogen, $C_{1-20}$ alkyl, aryl, or aralkyl or two adjacent $R^b$ groups are joined together thereby forming a ring;

$G^c$ independently each occurrence is hydrogen, halo, $C_{1-20}$ alkyl, aryl, or aralkyl, or two adjacent $G^c$ groups are joined together thereby forming a ring, c is 1-5 and c' is 1-4; and $G^d$ is isopropyl or cyclohexyl.

Most highly preferred examples of metal complexes for use according to the present invention are complexes of the following formulas:

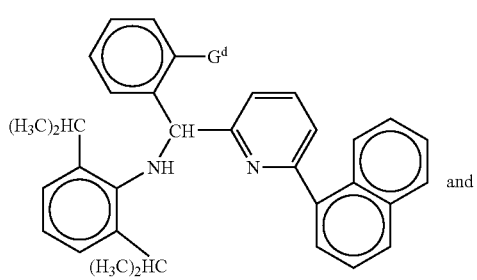

(V)

and

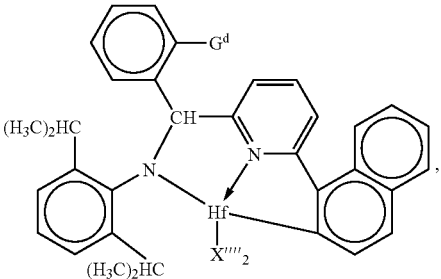

(VA)

wherein X"" each occurrence is halide, N,N-dimethylamido, benzyl, $C_{1-20}$ alkyl, or tri(methyl)silyl-substituted alkyl, preferably each occurrence X"" is methyl, chloro, or tri(methyl)silylmethyl; and $G^d$ is isopropyl or cyclohexyl.

In another preferred embodiment, it has been discovered that the presence of one or more silyl-substituted hydrocarbyl X"" groups, such as tri(methyl)silyl-methyl groups, improves the solubility of the metal complexes in aliphatic hydrocarbon diluents and results in extremely high polymerization efficiency.

It is expressly intended that the foregoing disclosure of preferred, more preferred, highly preferred, and most preferred embodiments of specific substituents with respect to any one of the foregoing formulas of the invention is applicable as well to any other of the preceding or succeeding formulas independent of any other substituent identity.

The above described metal complexes of the invention are typically activated in various ways to yield catalyst compounds having a vacant coordination site that will coordinate, insert, and polymerize addition polymerizable monomers, especially olefin(s). For the purposes of this patent specification and appended claims, the term "activator" is defined to be any compound or component or method which can activate any of the catalyst compounds of the invention as described above. Non-limiting examples of activators include a Lewis acid or a non-coordinating ionic activator or ionizing activator or any other compounds including Lewis bases, organometal compounds and combinations thereof that can convert a neutral catalyst compound to a catalytically active species.

One suitable class of activator or cocatalyst are alumoxanes, also referred to as alkylaluminoxanes. Alumoxanes are well known activators for use with metallocene type catalyst compounds to prepare addition polymerization catalysts. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656; European publications EP-A-561476, EP-A-279586 and EP-A-594218; and PCT publication WO 94/10180.

Alumoxane(s) or modified alumoxane(s) and/or other activators, neutral or ionic, such as tri (n-butyl) ammonium tetrakis (pentafluorophenyl) boron, a trisperfluorophenyl boron metalloid precursor or a trisperfluoronaphthyl boron metalloid precursor, polyhalogenated heteroborane anions (WO 98/43983) or combination thereof, that would activate the neutral catalyst compound may be used as the activator.

Ionizing compounds may contain an active proton, or some other cation associated with but not coordinated to or only loosely coordinated to the remaining ion of the ionizing compound. Such compounds and the like are described in European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124. Preferred among the foregoing activators are ammonium cation containing salts, especially those containing trihydrocarbyl-substituted ammonium cations containing one or two $C_{10-40}$ alkyl groups, especially methylbis(octadecyl)ammonium- and methylbis(tetradecyl)-ammonium-cations. It is further understood that the cation may comprise a mixture of hydrocarbyl groups of differing lengths. For example, the protonated ammonium cation derived from the commercially available long chain amine comprising a mixture of two $C_{14}$, $C_{16}$ or $C_{18}$ alkyl groups and one methyl group. Such amines are available from Witco Corp., under the trade name Kemamine™ T9701, and from Akzo-Nobel under the trade name Armeen™ M2HT.

It is also within the scope of this invention that the above described metal complexes can be combined with more than one of the activators or activation methods described above. The mole ratio of the activator component(s) to the metal complex in the catalyst compositions suitably is in the range of between 0.3:1 to 2000:1, preferably 1:1 to 800:1, and most preferably 1:1 to 500:1. Where the activator is an ionizing activator such as those based on the anion tetrakis(pentafluorophenyl)boron or the strong Lewis acid trispentafluorophenylboron, the mole ratio of the metal or metalloid of the activator component to the metal complex is preferably in the range of between 0.3:1 to 3:1.

In addition to the metal complex and cocatalyst or activator, it is contemplated that certain tertiary components or mixtures thereof may be added to the catalyst composition or the reaction mixture in order to obtain improved catalyst performance or other benefit. Examples of such tertiary components include scavengers designed to react with contaminants in the reaction mixture to prevent catalyst deactivation. Suitable tertiary components may also activate or assist in activation of one or more of the metal complexes employed in the catalyst composition.

Examples include Lewis acids, such as trialkylaluminum compounds, dialkylaluminum aryloxides, alkylaluminum diaryloxides, dialkylaluminum amides, alkylaluminum diamides, dialkylaluminum tri(hydrocarbylsilyl)amides, and alkylaluminum bis(tri(hydrocarbylsilyl)amides).

The propylene-alpha olefin copolymers are preferably made using a solution polymerization process. Examples of solution processes that are suitably employed with the catalyst compositions of the present invention are described in U.S. Pat. Nos. 4,271,060, 5,001,205, 5,236,998, and 5,589,555. Highly preferably the solution process is ethylene/propylene copolymerization operated in a continuous or semi-continuous manner with high propylene and ethylene conversion. Highly preferably such process is conducted at a temperature greater than or equal to 100° C., more preferably greater than or equal to 110° C., and most preferably greater than or equal to 115° C.

Suitable addition polymerization processes wherein the present catalyst compositions may be employed include solution, gas phase, slurry phase, high pressure, or combinations thereof.

If the propylene-alpha olefin copolymers are made in a gas phase, high pressure and/or slurry polymerization process, then the above described catalyst compounds and catalyst compositions preferably are combined with one or more support materials or carriers using one of the support methods well known in the art or as described below. Either the catalyst composition or the individual components thereof may be in a supported form, for example deposited on, contacted with, or incorporated within a support or carrier.

The terms "support" or "carrier" are used interchangeably and are any porous or non-porous support material, preferably a porous support material, for example, inorganic oxides, carbides, nitrides, and halides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The Polypropylene

The polypropylene of the invention can comprise a random propylene copolymer, a propylene impact copolymer, a propylene homopolymer, a polypropylene copolymer and mixtures thereof. The polypropylene exhibits a peak melting point ($T_{max}$), as determined by DSC, of at least 120° C., preferably at least 130° C., more preferably at least 140° C., and for applications which require particularly high heat resistance, a $T_{max}$ of at least 150° C., preferably at least 160° C. The polypropylene is stereoregular, preferably having isotactic stereoregular propylene sequences. The polypropylene exhibits a heat of fusion higher than the heat of fusion for the propylene-alpha olefin copolymer of the invention.

The polypropylene can be prepared by typical polypropylene production processes, known to one of ordinary skill in the art and can be made using a variety of catalysts, including metallocene and Ziegler-Natta catalysts. Polypropylenes made using Ziegler-Natta catalysts are preferred due to their relatively low cost to produce, their high level of isotactic sequences and high crystallinities. The polypropylenes typically have molecular weight distributions (Mw/Mn) of at least 3.0, preferably at least 3.5, further more preferably at least 4.0, and for some applications, at least 4.5, and preferably at least 5.

The polypropylene typically has a melt flow rate of from 0.1 g/10 min to 50 g/10 min. Preferably, the ratio of the intrinsic viscosity of the propylene-alpha olefin copolymer to the intrinsic viscosity of the polypropylene is typically between 0.5 and 3, more preferably between 0.8 and 2, further more preferably between 0.8 and 1.5. The intrinsic viscosity can be determined in accordance with ASTM D5225-98.

In one aspect of the invention, polypropylene copolymers are used for the polypropylene component of the blend. In these aspects a random propylene copolymer is preferred. If a propylene-ethylene copolymer makes up the propylene-alpha olefin copolymer component of the blend, then a random propylene copolymer incorporating units derived from ethylene preferably is utilized to increase the compatibility between the propylene-ethylene copolymer component and the polypropylene component of the blend. Increasing the compatibility will provide a blend exhibiting better physical properties, as discussed earlier. The polypropylene copolymer, preferably has from 0.5 to 6 percent by weight units derived from an alpha olefin, with the alpha-olefin preferably matching the alpha-olefin comprising the propylene-alpha olefin copolymer component of the blend. For example, if a propylene-ethylene copolymer makes up the propylene-alpha olefin copolymer of the blend, then the polypropylene component preferably is a polypropylene copolymer having from 0.5 to 6 percent by weight units derived from ethylene, more preferably it is a random propylene copolymer having from 0.5 to 6 percent by weight units derived from ethylene.

In another aspect of the invention, the polypropylene is a propylene impact copolymer. The matrix may be either a propylene homopolymer or a polypropylene copolymer. For applications requiring an excellent balance of physical properties, a polypropylene copolymer preferably is utilized. For applications demanding the highest heat resistance, a propylene homopolymer preferably utilized. The propylene impact copolymer may be either a physical blend of the matrix polymer and the elastomer polymer or it may be made by an in-reactor blend manufactured by an in-reactor process as known to one of ordinary skill in the art. As described above for the polypropylene copolymers, the monomers used to construct the propylene impact copolymer are selected to be compatible with the comonomers present in the propylene-alpha olefin copolymer component of the blend. For ease of manufacturing, the matrix typically is a propylene-ethylene, a propylene-ethylene-butene, or a propylene-butene copolymer, with propylene-ethylene copolymer matrixes being more preferred. For similar reasons, the elastomer phase is typically a propylene-ethylene, propylene-ethylene-butene or a propylene-butene rubber. Preferably, the propylene impact copolymer is an in-reactor blend, due to the enhanced rubber dispersion that these blends exhibit. Preferably, the elastomer phase is greater than 10 percent by weight, more preferably greater than 15 percent by weight, most preferably greater than 20 percent by weight of the impact copolymer. The rubber phase of the propylene impact copolymer has similar properties to discussed below for the elastomer component.

The Elastomer Component

The blend of the invention optionally contains an elastomer component in addition to the propylene-alpha olefin. Typical elastomers that can be utilized include olefinic copolymers (such as ethylene-alpha olefin copolymers, propylene-alpha olefin copolymers (such as ethylene-propylene rubber (EPR)), ethylene-propylene-diene copolymers (EPDM)), functionalized copolymers (such as ethylene-acrylic acid copolymers (EAA), ethylene-vinyl acetate copolymer (EVA), block copolymer rubbers (such as styrene-butadiene-styrene copolymers (SBS), styrene-isoprene-styrene copolymers (SIS), styrene-ethylene-butene-styrene copolymers (SEBS) and other elastomers known to one of ordinary skill in the art. SEPS, SEBS, and other styrenic block copolymers preferably are incorporated into blends for use in soft-touch applications.

The elastomer component preferably has a glass transition temperature ($T_{ge}$) which is lower than the glass transition temperature of the propylene-alpha olefin copolymer ($T_{gp}$), more preferably $T_{gp}$ is at least 5° C. higher than $T_{ge}$. Glass transition temperature is determined by DSC analysis in accordance with procedures known to one of ordinary skill in the art. Additionally, the elastomer component preferably is not substantially miscible in the propylene-alpha olefin copolymer or the polypropylene. For the purposes of this invention, two polymers are not substantially miscible if, after being blended together, the blend exhibits at least two separate identifiable glass transition temperatures (as measured by DSC) that correspond to the glass transition temperatures of the non-blended polymers.

EXAMPLES

Synthesis of rac-[dimethylsilylbis(1-(2-methyl-4-phenyl)indenyl)]zirconium (1,4-diphenyl-1,3-butadiene) (Catalyst A)

Catalyst A can be synthesized according to Example 15 of U.S. Pat. No. 5,616,664.

Synthesis of rac-[1,2-ethanediylbis(1-indenyl)]zirconium(1,4-diphenyl-1,3-butadiene) (Catalyst B)

Catalyst B can be synthesized according to Example 11 of U.S. Pat. No. 5,616,664.

Synthesis of Catalyst C

Hafnium tetrakisdimethylamine. The reaction is prepared inside of a dry box. A 500 mL round bottom flask containing a stir bar, is charged with 200 mL of toluene and LiNMe$_2$ (21 g, 95%, 0.39 mol). HfCl$_4$ (29.9 g, 0.093 mol) is added slowly over 2 h. The temperature reaches 55° C. The mixture is stirred overnight at ambient temperature. The LiCl is filtered off. The toluene is carefully distilled away from the product. Final purification is achieved by distillation with a vacuum transfer line attached to a cold (−78° C.) receiving flask. This process is performed outside the dry box on a Schlenk line. The material is distilled over at 110-120° C. at 300-600 microns. The 19.2 g of the white solid is collected.

2-formyl-6-naphthylpyridine. Inside of a dry box, naphthylboronic acid (9.12 g, 53.0 mmol) and Na$_2$CO$_3$ (11.64 g, 110 mmol) are dissolved in 290 mL of degassed 4:1 H$_2$O/MeOH. This solution is added to a solution of 8 g (43 mmol) of 2-bromo-6-formylpyridine and 810 mg (0.7 mmol) of Pd(PPh$_3$)$_4$ in 290 mL of degassed toluene. The charged reactor is removed from the dry box, while under a blanket of N$_2$ and is connected to the house N$_2$ line. The biphasic solution is vigorously stirred and heated to 70° C. for 4 h. On cooling to RT, the organic phase is separated. The aqueous layer is washed with 3×75 mL of Et$_2$O. The combined organic extracts are washed with 3×100 mL of H$_2$O and 1×100 mL of brine and dried over Na$_2$SO$_4$. After removing the volatiles in vacuo, the resultant light yellow oil is purified via trituration with hexanes. The isolated material is recrystallized from a hot hexane solution and ultimately yielded 8.75 g, 87% yield. mp 65-66° C.

$^1$H NMR (CDCl$_3$) δ 7.2-8.3 (m, 10H), 10.25 (s, 1H) ppm. $^{13}$C NMR (CDCl$_3$) 120.3, 125.64, 125.8, 126.6, 127.26, 128.23, 129.00, 129.74, 130.00, 131.39, 134.42, 137.67, 137.97, 153.07, 160.33, 194.23 ppm.

6-naphthylpyridine-2-(2,6-diisopropylphenyl)imine: A dry, 500 mL 3-neck round bottom flask is charged with a solution of 5.57 g (23.9 mmol) of 2-formyl-6-naphthlypyridine and 4.81 g (27.1 mmol) of 2,6-diisopropylaniline in 238 mL of anhydrous THF containing 3 Å molecular sieves (6 g) and 80 mg of p-TsOH. The loading of the reactor is performed under N$_2$. The reactor is equipped with a condenser, an over head mechanical stirrer and a thermocouple well. The mixture is heated to reflux under N$_2$ for 12 h. After filtration and removal of the volatile in vacuo, the crude, brown oil is triturated with hexanes. The product is filtered off and rinsed with cold hexanes. The slightly off white solid weighs 6.42 g. No further purification is performed. mp 142-144° C.

$^1$H NMR (CDCl$_3$) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H) ppm. $^{13}$C NMR (CDCl$_3$) 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86 ppm.

(6-naphthyl-2-pyridyl)-N-(2,6-diisopropylphenyl)benzylamine: A 250 mL 3-neck flask, equipped with mechanical stirrer and a N$_2$ sparge, is charged with 6-naphthylpyridine-2-(2,6-diisopropylphenyl)imine (6.19 mg, 15.8 mmol) and 80 mL of anhydrous, degassed Et$_2$O. The solution is cooled to −78° C. while a solution of phenyllithium (13.15 mL of 1.8 M in cyclohexane, 23.7 mmol) is added dropwise over 10 min.

After warming to RT over 1 h. the solution is stirred at RT for 12 hours. The reaction is then quenched with ~50 mL of aq. NH$_4$Cl. The organic layer is separated, washed with brine and H$_2$O, then dried over Na$_2$SO$_4$. Using the Biotage Chromatography system (column # FK0-1107-19073, 5% THF/95% hexanes), the product is isolated as a colorless oil. The chromatography is performed by dissolving the crude oil in 50 mL of hexanes. The purification is performed in 2×~25 mL batches, using half of the hexane stock solution for each run. 7.0 g of the oil is isolated (93% yield).

$^1$H NMR (CDCl$_3$) δ 0.90 (d, 12H), 3.0 (m, 2H), 4.86 (s, 1H), 5.16 (s, 1H), 7.00 (m, 3H), 7.1-7.6 (m, 12H), 7.8-7.88 (m, 2H), 7.91-7.99 (d, 1H) ppm. $^{13}$C NMR (CDCl$_3$) 24.58, 28.30, 70.02, 121.14, 123.62, 123.76, 123.95, 125.71, 126.32, 126.55, 126.74, 127.45, 128.04, 128.74, 129.47, 131.66, 134.49, 137.4, 138.95, 142.68, 143.02, 143.89, 159.36, 162.22 ppm.

Catalyst C-(Nme$_2$)$_3$: The reaction is performed inside of a dry box. A 100 mL round bottom flask is charged with Hf(Nme$_2$)$_4$ (2.5 g, 5.33 mmol), 30 mL of pentane and a stir bar. The amine 1 is dissolve in 40 mL of pentane then added to the stirring solution of Hf(Nme$_2$)$_4$. The mixture is stirred at ambient temperature for 16 h (overnight). The light yellow solid is filtered off and rinsed with cold pentane. The dry weight of the powder is 2.45 g. A second crop is collected from the filtrate weighing 0.63 g. The overall yield is 74%.

$^1$H NMR(C$_6$D$_6$) δ 0.39 (d, 3H, J=6.77 Hz), 1.36 (d, 3H, J=6.9 Hz), 1.65 (d, 3H, J=6.68 Hz), 1.76 (d, 3H, J=6.78 Hz), 2.34 (br s, 6H), 2.80 (br s, 6H), 2.95 (br s, 6H), 3.42 (m, 1H, J=6.8 Hz), 3.78 (m, 1H, J=6.78 Hz), 6.06 (s, 1H), 6.78 (m, 2H), 6.94 (m, 1H), 7.1-7.4 (m, 13H), 7.8 (m, 2H) ppm.

Catalyst C: The reaction is performed inside of a dry box. A 100 mL round bottom flask is charged with 70 mL of pentane and 15 mL of a 2.0 M trimethyl aluminum in hexane solution. The solution is cooled to −40° C. The hafnium trisamide compound from the previous reaction (1.07, g 1.28 mmol) is added in small portions over 5-10 minutes. Upon the addition, a white gelatinous residue forms. After 45-60 min the reaction becomes yellow with a fine, yellow, powder precipitating from the mixture. After a total reaction time of 2.5 h the mixture is filtered and 615 mg of Catalyst C is isolated as a bright, yellow powder. No further purification is performed.

$^1$H NMR(C$_6$D$_6$) δ 0.51 (d, 3H, J=6.73 Hz), 0.79 (s, 3H), 1.07 (s, 3H), 1.28 (d, 3H, J=6.73 Hz), 1.53 (m, 6H), 3.37 (m, 1H, J=6.75 Hz), 3.96 (m, 1H, J=6.73 Hz), 6.05 (s, 1H), 6.50 (d, 1H, J=7.75 Hz), 6.92 (t, 1H, J=7.93 Hz), 7.1-7.59 (m, 12H), 7.6 (d, 1H), 7.8-8.0 (m, 2H), 8.3 (m, 1H), 8.69 (d, 1H, J=7.65 Hz) ppm.

Synthesis of Catalyst D

To a solution of 9-bromophenanthrene (10.36 mg, 41 mmol) in 132 mL of anhydrous, degassed Et$_2$O cooled to −40° C. is added under N$_2$ 27 mL (43.2 mmol) of a 1.6 M solution of n-BuLi in hexanes. The solution is swirled to mix and allowed to react at −40° C. for 3 hours during which colorless crystals precipitated from solution. The 9-phenanthrenyllithium is added as a slurry to a well-mixed solution of 6-naphthylpyridine-2-(2,6-diisopropylphenyl)imine (10.6 g, 27.04 mmol) in 130 mL of Et$_2$O cooled to −40° C. After warming to ambient temperature over 1 h, the solution is stirred at ambient temperature for 2 hours. The reaction is then quenched with aq. NH$_4$Cl, and subjected to an aqueous/organic work-up. The organic washes are combined and dried over Na$_2$SO$_4$. Upon removal of the volatiles with rotary evaporation, the product precipitates from solution. The isolated solids are rinsed with cold hexanes. The material is vacuum dried at 70° C. using the house vacuum over night. The dried material is isolated as a white solid, weighing 12.3 g for a yield of 80%. A second crop is isolated weighing 0.37 g. Mp 166-168° C.

$^1$H NMR(C$_6$D$_6$) δ 1.08 (dd, 12H), 3.43 (m, 2H), 5.47 (m, 1H), 6.16 (d, 1H), 7.0-7.8 (m, 14H), 8.2 (d, 1H), 8.5-8.6 (m, 4H), ppm. $^{13}$C NMR (CDCl$_3$) 24.68, 28.22, 68.87, 120.56, 122.89, 123.63, 123.73, 124.07, 124.1, 125.5, 125.59, 126.24, 126.42, 126.52, 126.76, 126.83, 126.9, 127.05, 127.14, 128.0, 128.55, 129.49, 129.55, 130.67, 130.71, 131.52, 131.55, 132.24, 134.39, 137.57, 143.31, 159.1, 162 ppm.

Catalyst D-(Nme$_2$)$_3$: Inside of a dry box, six different teflon-screw capped, glass pressure tube reactors are each charged with Hf(Nme$_2$)$_4$ (1.55 g, 4.37 mmol, overall 9.3 g, 26.2 mmol), 10 mL of toluene and the ligand isolated from the previous procedure above (2.1 g, 3.68 mmol, overall 12.6 g, 22.1 mmol). The tightly sealed reactors are removed from the dry box and placed in a heater block with the temperature set at 125° C. The reactor tubes are heated overnight (~16 h). The cooled tubes are taken into the dry box and the contents of the reactor tubes are combined in a 500 mL round bottom flask. The flask is placed under vacuum to remove the dimethylamine and toluene. The light yellow/green solid which is left is rinsed with ~125 mL of cold pentane and filtered, yielding 13.6 g of a light yellow powder for a yield of 65%.

Catalyst D: The reaction is performed inside of a dry box. A 500 mL jar is charged with 250 mL of pentane and the hafnium amide isolated in the procedure outlined immediately above (13.6 g, 15.5 mmol). The mixture is cooled to −40° C. To the stirring mixture is slowly added 70 mL of a 2.0 M trimethyl aluminum (140 mmol) in hexane solution. After 3 h the reaction becomes yellow with a fine, powder precipitating from the mixture. The mixture is then cooled to −40° C. and filtered. The initially collected product is rinsed with 2×60 mL of cold pentane. 10.24 g Catalyst D is isolated (84% yield) with a purity of >99% by $^1$H NMR.

Synthesis of Catalyst F

Catalyst F is made in an analogous manner to Catalyst D, excepting that 2-methyl-bromobenzene is used as a starting material instead of 9-bromophenanthrene.

Synthesis of Armeenium Borate
[methylbis(hydrogenatedtallowalkyl)ammonium tetrakis (pentafluoro phenyl) borate]

Armeenium borate can be prepared from ARMEEN® M2HT (available from Akzo-Nobel), HCl, and Li [B(C$_6$F$_5$)$_4$] according to Example 2 of U.S. Pat. No. 5,919,983.

General 1 Gallon Continuous Solution
Propylene/Ethylene

Copolymerization Procedure

Examples 1-10 and Comparative Examples

Purified toluene solvent, ethylene, hydrogen, and propylene are supplied to a 1 gallon reactor equipped with a jacket for temperature control and an internal thermocouple. The solvent feed to the reactor is measured by a mass-flow controller. A variable speed diaphragm pump controls the solvent flow rate and increases the solvent pressure to the reactor. The propylene feed is measured by a mass flow meter and the flow is controlled by a variable speed diaphragm pump. At the discharge of the pump, a side stream is taken to provide flush flows for the catalyst injection line and the reactor agitator. The remaining solvent is combined with ethylene and hydrogen and delivered to the reactor. The ethylene stream is measured with a mass flow meter and controlled with a Research Control valve. A mass flow controller is used to deliver hydrogen into the ethylene stream at the outlet of the ethylene control valve. The temperature of the solvent/monomer is controlled by use of a heat exchanger before entering the reactor. This stream enters the bottom of the reactor. The catalyst component solutions are metered using pumps and mass flow meters, and are combined with the catalyst flush solvent. This stream enters the bottom of the reactor, but in a different port than the monomer stream. The reactor is run liquid-full at 500 psig with vigorous stirring. The process flow is in from the bottom and out of the top. All exit lines from the reactor are steam traced and insulated. Polymerization is stopped with the addition of a small amount of water, and other additives and stabilizers can be added at this point. The stream flows through a static mixer and a heat exchanger in order to heat the solvent/polymer mixture. The solvent and unreacted monomers are removed at reduced pressure, and the product is recovered by extrusion using a devolatilizing extruder. The extruded strand is cooled under water and chopped into pellets. The operation of the reactor is controlled with a process control computer.

Example 1

Propylene/Ethylene Polymerization

Using Metallocene Catalyst A (Comparative)

Figure 6:
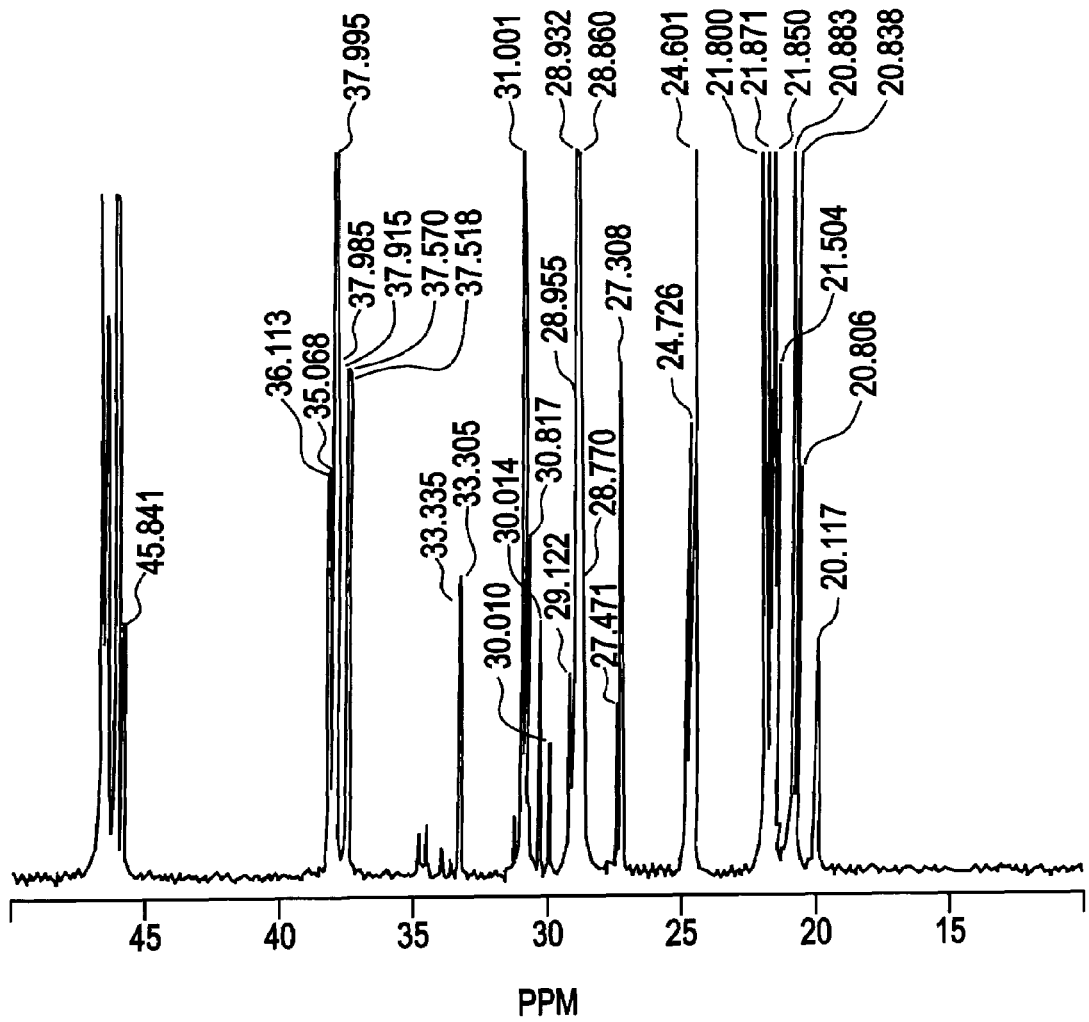
FIG. 6 shows the $^{13}$C NMR Spectrum of the P/E copolymer product of Comparative Example 1 prepared using metallocene Catalyst A demonstrating the absence of regio-error peaks in the region around 15 ppm.

The general procedure for the 1 gallon continuous solution polymerization outlined above was employed. A catalyst solution containing 2.6 ppm Zr from Catalyst A was prepared and added to a 4 L catalyst storage tank. This solution was combined in a continuous stream with a continuous stream of a solution containing Armeenium tetrakis(pentafluorophenyl)borate in toluene and a continuous stream of a solution of PMAO-IP in toluene to give a ratio of total Ti:B:Al of 1:1.2:30. The activated catalyst solution was fed continuously into the reactor at a rate sufficient to maintain the reactor temperature at approximately 80° C. and a polymer production rate of approximately 3 pounds an hour. The polymer solution was continuously removed from the reactor exit and was contacted with a solution containing 100 ppm of water for each part of the polymer solution, and polymer stabilizers (i.e., 1000 ppm Irgaphos 168 and 1000 ppm Irganox 1010 per part of the polymer). The resulting exit stream was mixed, heated in a heat exchanger, and the mixture was introduced into a separator where the molten polymer was separated from the solvent and unreacted monomers. The resulting molten polymer was extruded and chopped into pellets after being cooled in a water bath. For this example, the propylene to ethylene ratio was 22.0. Product samples were collected over 1 hour time periods, after which time the melt flow rate was determined for each sample. FIG. 6 is a $^{13}$C NMR of Comparative Example 1, and it demonstrates the absence of regio-error peaks in the region around 15 ppm.

Examples 2-6

Figure 4:
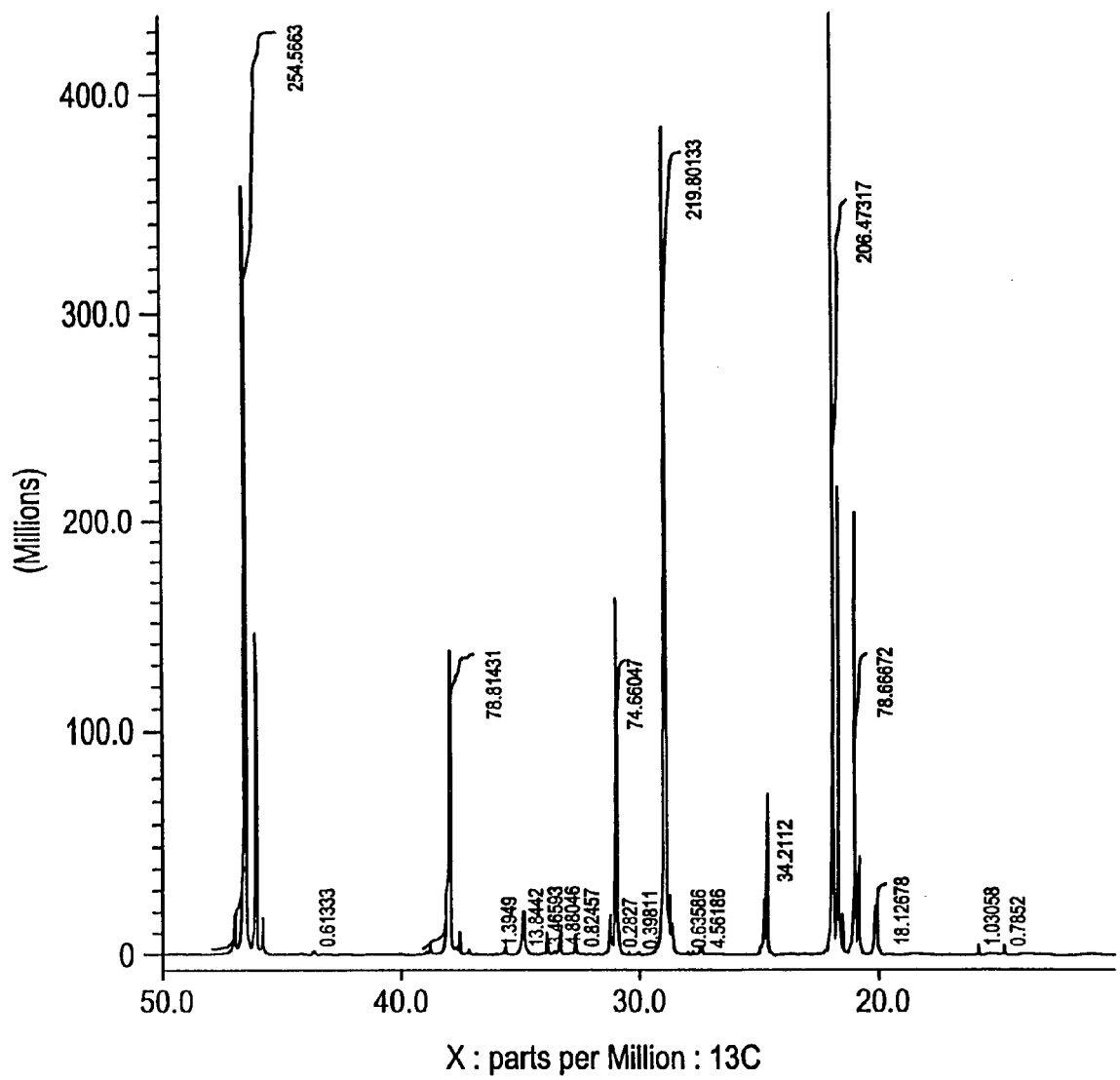
FIG. 4 shows the $^{13}$C NMR Spectrum of the P/E* copolymer product of Example 2 prepared using Catalyst C.
Figure 5:
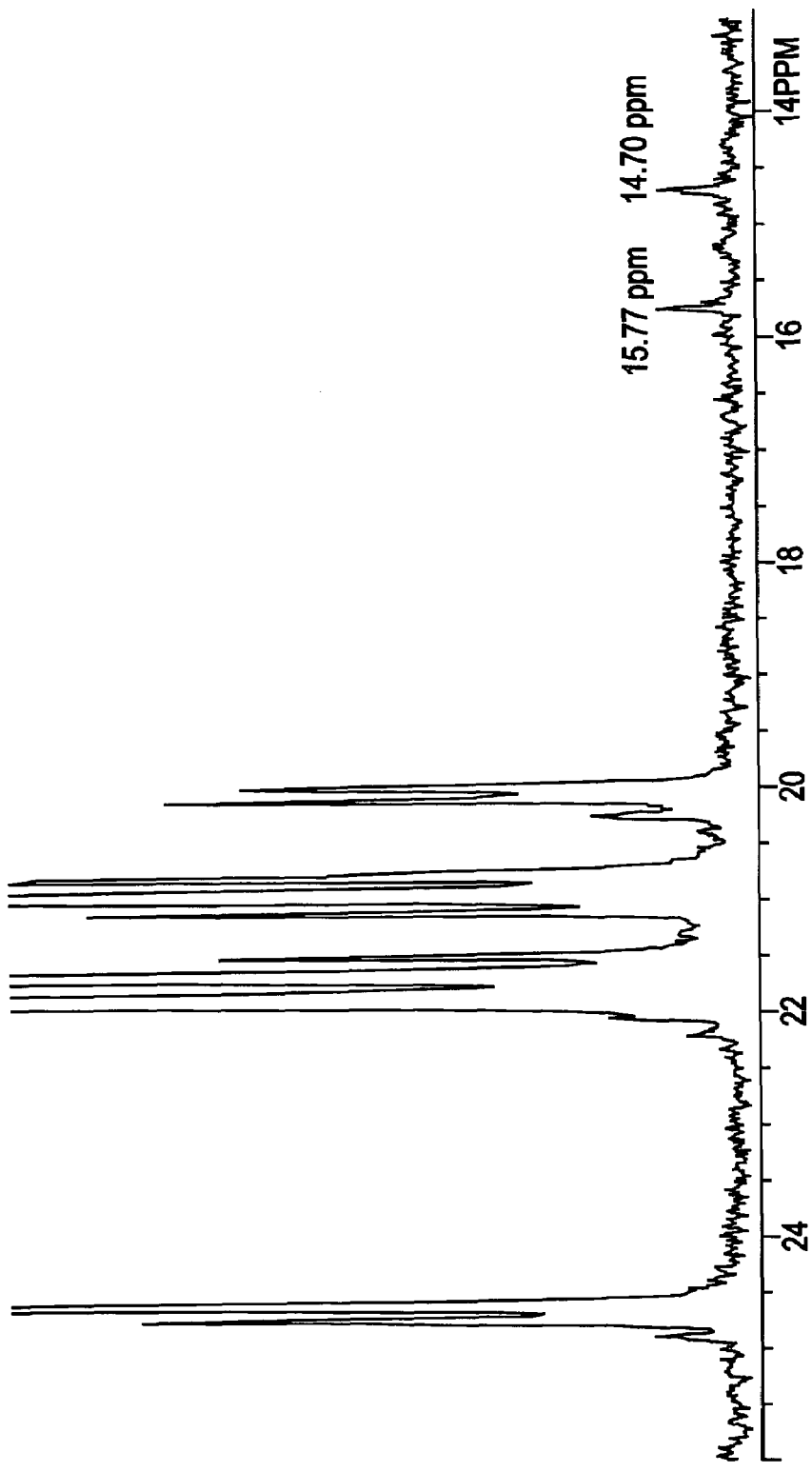
FIG. 5 shows the $^{13}$C NMR Spectrum of the copolymer product of Example 2, prepared using Catalyst C. This spectrum is shown at an expanded Y-axis scale relative to FIG. 4 in order to more clearly show the regio-error peaks.

Examples 2-6 were conducted similar to Example 1 except as otherwise noted in Tables 2-6-1 and 2-6-2 below. Catalyst A is listed for comparative purposes. FIG. 4 is the $^{13}$C NMR spectrum of the propylene/ethylene copolymer product of Example 2. FIGS. 1A and 1B show a comparison of the DSC heating traces of the propylene/ethylene copolymers of Comparative Example 1 and Example 2.

TABLE 2-6-1

Polymerization Conditions

| Example | Reactor TEMP DEGC | SOLV FLOW LB/HR | C2 FLOW LB/HR | C3 FLOW LB/HR | H2 FLOW SCCM | POLY LBS/HR production rate |
|---|---|---|---|---|---|---|
| 1 (comparative) | 80.5 | 36.0 | 0.50 | 11.00 | 0 | 3.13 |
| 2 | 80.5 | 33.0 | 0.20 | 6.00 | 20.8 | 3.47 |
| 3 | 80.1 | 26.0 | 0.10 | 6.00 | 14.1 | 3.09 |
| 4 | 79.9 | 26.0 | 0.20 | 6.00 | 20.1 | 3.25 |
| 5 | 80.0 | 26.0 | 0.30 | 6.00 | 26.1 | 3.16 |
| 6 | 80.3 | 26.0 | 0.40 | 6.00 | 32.1 | 3.32 |

TABLE 2-6-2

Monomer conversion and activity

| Example | Catalyst | C3/C2 ratio | propylene conversion | ethylene conversion | catalyst concentration ppm (metal) | efficiency g metal per g polymer |
|---|---|---|---|---|---|---|
| 1 (comparative) | A | 22.00 | 25.7% | 64.8% | 2.6 | 6,145,944 |
| 2 | C | 30.17 | 53.1% | 99.1% | 25.6 | 235,823 |
| 3 | D | 61.07 | 48.7% | 98.4% | 55.0 | 225,666 |
| 4 | D | 30.34 | 49.7% | 99.0% | 55.0 | 259,545 |
| 5 | D | 20.17 | 46.8% | 98.6% | 55.0 | 259,282 |
| 6 | D | 15.00 | 48.0% | 98.7% | 55.0 | 278,579 |

TABLE 2-6-3

Summary of Polymer Analysis Data

| Example | MFR (g/10 min) | Density (kg/dm3) | Cryst. (%) from density | DSC Tg (° C.) | Tc, o (° C.) | Tc, p (° C.) |
|---|---|---|---|---|---|---|
| 1 | 72 | 0.8809 | 37.9 | −26.1 | 52.3 | 47.6 |
| 2 | 1.7 | 0.8740 | 29.6 | −24.8 | 59.0 | 49.3 |
| 3 | 2.2 | 0.8850 | 42.8 | −10.0 | 76.6 | 64.5 |
| 4 | 2.3 | 0.8741 | 29.7 | −23.2 | 50.8 | 41.6 |
| 5 | 2 | 0.8648 | 18.3 | −27.1 | 30.4 | 10.9 |
| 6 | 2.0 | 0.8581 | 9.9 | −29.6 | — | — |

TABLE 2-6-4

Summary of Polymer Analysis Data cont'd

| Example | ΔHc (J/g) | Cryst. (%) (from Hc) | Tm, p (° C.) | Tm, e (° C.) | ΔHf (J/g) | Cryst. (%) (from Hf) |
|---|---|---|---|---|---|---|
| 1 | 40.8 | 24.7 | 91.9 | 114.3 | 52.1 | 31.6 |
| 2 | 27.1 | 16.4 | 64.5 | 128.9 | 38.0 | 23.0 |
| 3 | 45.0 | 27.3 | 102.2 | 145.7 | 65.3 | 39.6 |
| 4 | 30.6 | 18.5 | 67.4 | 145.6 | 42.9 | 26.0 |
| 5 | 8.7 | 5.3 | 50.0 | 119.4 | 13.0 | 7.9 |
| 6 | — | — | — | — | — | — |

TABLE 2-6-5

Summary of Polymer Analysis Data cont'd

| Example | Ethylene (wt %)* | Ethylene (mol %)* | Regio-errors 14-16 ppm (mol %)* | Mn (kg/mol) | Mw (kg/mol) | MWD |
|---|---|---|---|---|---|---|
| 1 | 9.5 | 13.6 | 0.00 | 58.5 | 117.4 | 2.0 |
| 2 | 8.2 | 11.8 | 0.24 | 132.6 | 315.7 | 2.4 |
| 3 | 5.6 | 8.2 | 0.46 | 146.0 | 318.3 | 2.2 |
| 4 | 8.2 | 11.8 | 0.34 | 138.5 | 305.7 | 2.2 |
| 5 | 11.1 | 15.8 | 0.35 | | | |
| 6 | 13.2 | 18.6 | 0.37 | 127.5 | 306.8 | 2.4 |

*determined by NMR

TABLE 2-6-6

Summary of Polmer Analysis Data cont'd

| Example | % mm* | % mr* | % rr* |
|---|---|---|---|
| 1 | 98.55 | 0 | 1.45 |
| 2 | 93.28 | 1.09 | 5.68 |
| 3 | 94.3 | 2.21 | 3.43 |
| 4 | 96.37 | 0 | 3.63 |
| 5 | 95.3 | 0.0 | 4.66 |
| 6 | 95.17 | 0 | 4.83 |

*corrected PPE + EPE

Example 7

Table 7 is a summary showing the skewness index, $S_{ix}$, for inventive and prior art samples. All of the samples were prepared and measured as described in Table C in the Description of the Preferred Embodiments and entitled Parameters Used for TREF. The copolymers of the invention have a skewness index greater than about (−1.2), preferably greater than −1.0, more preferably greater than −0.8, and further more preferably greater than −0.7 and in some instances greater than −0.60. The skewness index of the propylene-ethylene copolymers of our invention, are indicative of the broad composition distribution of the copolymers. The results from Table 7 are represented graphically in FIG. 12.

The inventive examples show unusual and unexpected results when examined by TREF. The distributions tend to cover a large elution temperature range while at the same time giving a prominent, narrow peak. In addition, over a wide range of ethylene incorporation, the peak temperature, $T_{Max}$, is near 60° C. to 65° C. In the prior art, for similar levels of ethylene incorporation, this peak moves to higher elution temperatures with lower ethylene incorporation.

For conventional metallocene catalysts the approximate relationship of the mole fraction of propylene, $X_p$, to the TREF elution temperature for the peak maximum, $T_{Max}$, is given by the following equation:

$$\log_e(X_p) = -289/(273+T_{max}) + 0.74$$

For the inventive copolymers, the natural log of the mole fraction of propylene, LnP, is greater than that of the conventional metallocenes, as shown in this equation:

$$LnP > -289/(273+T_{max}) + 0.75$$

TABLE 7

Summary of Skewness Index Results

| Inventive | Catalyst Type | Ethylene Content (Mole %) | Elution Temperature of Peak Maximum (° C.) | Upper Temperature Quartile Range (° C.) | Inventive $S_{ix}$ |
|---|---|---|---|---|---|
| Sample 7-1 | Catalyst D | 8.2 | 61.4 | 9.3 | 0.935 |
| Sample 7-2 | Catalyst F | 8.9 | 60.8 | 6.4 | −0.697 |
| Sample 7-3 | Catalyst F | 8.5 | 61.4 | 8.5 | −0.642 |
| Sample 7-4 | Catalyst F | 7.6 | 65.0 | 9.1 | 0.830 |
| Sample 7-5 | Catalyst F | 7.6 | 65.0 | 9.8 | 0.972 |
| Sample 7-6 | Catalyst F | 8.6 | 61.4 | 7.9 | 0.804 |
| Sample 7-7 | Catalyst F | 9.6 | 60.2 | 4.8 | −0.620 |
| Sample 7-8 | Catalyst F | 12.4 | 60.2 | 9.0 | 0.921 |
| Sample 7-9 | Catalyst F | 8.6 | 60.8 | 7.2 | −0.434 |
| Sample 7-10 | Catalyst F | 8.6 | 62.0 | 9.4 | 1.148 |
| Sample 7-11 | Catalyst D | | 57.8 | 7.6 | 1.452 |
| Sample 7-12 | Catalyst F | | 78.2 | 7.1 | 1.006 |
| Sample 7-13 | Catalyst D | 4.4 | 80.0 | 7.4 | −1.021 |

TABLE 7-continued

Summary of Skewness Index Results

| Inventive | Catalyst Type | Ethylene Content (Mole %) | Elution Temperature of Peak Maximum (° C.) | Upper Temperature Quartile Range (° C.) | Inventive $S_{ix}$ |
|---|---|---|---|---|---|
| Sample 7-14 | Catalyst A | 7.6 | 80.6 | 1.7 | −1.388 |
| Sample 7-15 | Catalyst A | 10.0 | 70.4 | 1.5 | −1.278 |
| Sample 7-16 | Catalyst A | 10.7 | 66.2 | 2.2 | −1.318 |
| Sample 7-17 | Catalyst B | 11.1 | 69.2 | 1.7 | −1.296 |
| Sample 7-18 | Catalyst A | 10.6 | 65.6 | 4.0 | −1.266 |

Example 8

The following example shows some of the physical properties that typically are exhibited by the propylene-alpha olefin copolymers of the current invention and are indicative of the broad composition distribution of the P/E* copolymers.

DSC analysis shows that propylene-ethylene copolymers produced by a solution polymerization process using a non-metallocene, metal-centered, pyridal-amine ligand catalyst have melting behavior that differs in surprising ways from propylene/ethylene copolymers produced by metallocene polymerization processes that are known in the art. The different melting behavior of these copolymers compared to that of copolymers that are known in the art not only demonstrates the novelty of these materials, but it is also believed lead to the advantages seen when the propylene-ethylene copolymers are incorporated into the blends of the current invention. The novel aspects of the melting behavior of these copolymers and their associated utility are discussed below, after first describing the DSC analysis method used for this example.

Any volatile materials (e.g., solvent or monomer) are removed from the polymer prior to DSC analysis. A small amount of polymer, typically five to fifteen milligrams, is accurately weighed into an aluminum DSC pan with lid. Either hermetic or standard type pans are suitable. The pan containing the sample is then placed on one side of the DSC cell, with an empty pan with lid placed on the reference side of the DSC cell. The DSC cell is then closed, with a slow purge of nitrogen gas through the cell during the test. Then the sample is subjected to a programmed temperature sequence that typically has both isothermal segments and segments where the temperature is programmed to increase or decrease at a constant rate. Results that are presented here were all obtained using heat-flux type DSC instruments manufactured by TA Instruments (e.g., Model 2910 DSC). The measurement principles underlying heat-flux DSC are described on page 16 of Turi, ibid. The primary signals generated by such instruments are temperature (units: ° C.) and differential heat flow (units: watts) into or out of the sample (i.e., relative to the reference) as a function of elapsed time. Melting is endothermic and involves excess heat flow into the sample relative to the reference, whereas crystallization is exothermic and involves excess heat flow out of the sample. These instruments are calibrated using indium and other narrow-melting standards. Calibration ensures that the temperature scale is correct and for the proper correction of unavoidable heat losses.

Temperature programs for DSC analysis of semi-crystalline polymers involve several steps. Although the temperature programs used to generate the data presented here differed in some details, the critical steps were maintained constant throughout. The first step is an initial heating to a temperature sufficient to completely melt the sample; for polypropylene homopolymers and copolymers, this is 210° C. or higher. This first step also helps insure excellent thermal contact of the polymer sample with the pan. Although details of this first step differed for data presented here—for example, the rate of heating, the upper temperature, and the hold time at the upper temperature—in all cases the choices were sufficient to achieve the principal objectives of this step, of bringing all samples to a common completely melted starting point with good thermal contact. The second step involves cooling at a constant rate of 10° C./min from an upper temperature of at least 210° C. to a lower temperature of 0° C. or less. The lower temperature is chosen to be at or slightly below the glass transition temperature of the particular propylene polymer. The rate of crystallization becomes very slow at the glass transition temperature; hence, additional cooling will have little effect on the extent of crystallization. This second step serves to provide a standard crystallization condition, prior to examining subsequent melting behavior. After a brief hold at this lower temperature limit, typically one to three minutes, the third step is commenced. The third step involves heating the sample from a temperature of 0° C. or lower (i.e., the final temperature of the previous step) to 210° C. or higher at a constant rate of 10° C./min. This third step serves to provide a standard melting condition, as preceded by a standard crystallization condition. All the melting behavior results presented here were obtained from this third step, that is, from the second melting of the sample.

The output data from DSC consists of time (sec), temperature (° C.), and heat flow (watts). Subsequent steps in the analysis of melting endotherms are as follows. First, the heat flow is divided by the sample mass to give specific heat flow (units: W/g). Second, a baseline is constructed and subtracted from the specific heat flow to give baseline-subtracted heat flow. For the analyses presented here, a straight-line baseline is used. The lower temperature limit for the baseline is chosen as a point on the high temperature side of the glass transition. The upper temperature limit for the baseline is chosen as a temperature about 5-10° C. above the completion of the melting endotherm. Although a straight-line baseline is theoretically not exact, it offers greater ease and consistency of analysis, and the error introduced is relatively minor for samples with specific heats of melting of about 15-20 Joules per gram or higher. Employing a straight-line baseline in lieu of a more theoretically correct baseline does not substantively affect any of the results or conclusions presented below, although the fine details of the results would be expected to change with a different prescription of the instrumental baseline.

There are a number of quantities that can be extracted from DSC melting data. Quantities that are particularly useful in demonstrating differences or similarities among different polymers are: (1) the peak melting temperature, $T_{max}$ (° C.), which is the temperature at which the baseline-subtracted heat flow is a maximum (here the convention is that heat flow into the sample is positive); (2) the specific heat of melting, $\Delta h_m$ (J/g), which is the area under the melting endotherm obtained by integrating the baseline-subtracted heat flow (dq/dt) (W/g) versus time between the baseline limits; (3) the specific heat flow $(dq/dt)_{max}$ (W/g) at the peak melting temperature; (4) the peak specific heat flow normalized by the specific heat of melting, $\{(dq/dt)_{max}/\Delta h_m\}$ (sec$^{-1}$); (5) the first moment $T_1$ of the melting endotherm, defined and calculated as described below; (6) the variance $V_1$ (° C.$^2$) of the melting endotherm relative to the first moment $T_1$, defined and calculated as described below; and (7) the square root of the variance, $V_1^{1/2}$ (° C.), which is one measure of the breadth of the melting endotherm.

Treatment of the melting endotherm as a distribution is a useful way to quantify its breadth. The quantity that is distributed as a function of temperature is the baseline-subtracted heat flow (dq/dt). That this is also a distribution of temperature is made explicit using the calculus chain rule, (dq/dt)=(dq/Dt)(Dt/dt) where (Dt/dt) is the heating rate. The standard definition of the first moment $T_1$ of this distribution is given by the following equation, where the integrations are carried out between the baseline limits. All integrations are most reliably performed as (dq/dt) versus time, as opposed to the alternative (dq/Dt) versus temperature. In the following equation, (dq/dt) and T are the specific heat flow and temperature at time t.

$$T_1 = \frac{\int T \cdot (dq/dt)dt}{\int (dq/dt)dt}$$

The variance $V_1$ relative to the first moment is then standardly defined as:

$$V_1 = \frac{\int (T-T_1)^2 \cdot (dq/dt)dt}{\int (dq/dt)dt}$$

Both $V_1$ and $V_1^{1/2}$ are measures of the breadth of the melting endotherm.

Results of DSC analyses of both inventive and comparative polymers are shown in Table 8-1. All the samples are propylene-ethylene copolymers, with the exception of samples 1-4 and 17 which are homopolymers. Polymers 8-1-1 to 4 were made with Catalyst C, polymers 8-1-5 to −16 were made using Catalyst D in a solution process. Polymers 8-1-17 to −27 were made with Catalyst A in a solution process. An idea of the precision of the experimental method plus the data analysis procedure is provided by replicates (polymers 17, 20, and 22) and by the consistency of results for sets of polymers that were synthesized under nearly identical conditions (polymers 1-4, 7-9, 10-12, and 13-16).

Differences in melting behavior are most easily seen with the aid of figures. FIG. 13 compares the melting endotherms of Samples 8 and 22a. These two propylene-ethylene copolymers have nearly equivalent heats of melting and mole percent ethylene contents, about 71 J/g and 8 mole %. However, despite these similarities, the melting behavior of the inventive copolymer (Sample 8) is surprisingly different than that of the comparative copolymer (Sample 22a). The melting endotherm of Sample 8 is shifted towards lower temperatures and significantly broadened, when comparing at equivalent heat of melting. These changes in melting behavior are unique to and characteristic of the propylene-ethylene copolymers used in the invention.

Comparison at equivalent heats of melting is particularly meaningful and relevant. This is because equivalent heats of melting implies approximately equal levels of crystallinity, which in turn implies that the room temperature moduli should be similar. Therefore, at a given modulus or stiffness, the propylene-ethylene copolymers of this invention possess usefully broadened melting ranges compared to typical metallocene propylene-alpha olefin copolymers.

FIGS. 14-18, which are derived from the results in Table 8-1, further highlight the differences in melting behavior for the propylene-ethylene copolymers of this invention compared to metallocene propylene-alpha olefin copolymers. For all five of these figures, quantities are plotted as functions of the heat of melting, which as described above is an especially meaningful and relevant basis for making intercomparisons and inferring utility. For these plots, data have broken into two series based on the catalyst type used to make the polymer, either metallocene or nonmetallocene type.

FIG. 14 demonstrates how the peak melting temperature is shifted towards lower temperature for the propylene-ethylene copolymers of this invention. All the changes in melting behavior, of which this shift in peak melting temperature is but one example, imply that there are differences in the crystalline structure at the level of crystal lamellae or other type of primary crystalline elements. In turn, such differences in crystalline structure can most reasonably be attributed to differences in microstructure, for example, the different type of mis-insertion errors that characterize the propylene-ethylene copolymers of this invention FIG. 15 which shows a plot of the temperature $T_{1\%c}$ at which there is approximately 1% residual crystallinity, demonstrates another surprising aspect of the melting behavior of the propylene-ethylene copolymers of this invention. The factor that is used to convert specific heat of melting into nominal weight % crystallinity is 165 J/g=100 weight % crystallinity. (Use of a different conversion factor could change details of the results but not substantive conclusions.) With this conversion factor, the total crystallinity of a sample (units: weight % crystallinity) is calculated as 100% times $\Delta h_m$ divided by 165 J/g. And, with this conversion factor, 1% residual crystallinity corresponds to 1.65 J/g. Therefore, $T_{1\%c}$ is defined as the upper limit for partial integration of the melting endotherm such that $\Delta h_m$ minus the partial integral equals 1.65 J/g, where the same lower limit and baseline are used for this partial integration as for the complete integration. Surprisingly, for the P/E* copolymers as compared to metallocene-catalyzed copolymers, this 1% residual crystallinity temperature shifts downward less rapidly with increase in ethylene level (i.e., with decrease in the heat of melting). This behavior of $T_{1\%c}$ is similar to that of the final temperature of melting $T_{me}$.

FIG. 16, which shows the variance relative to the first moment of the melting endotherm as a function of the heat of melting, demonstrates directly the greater breadth of the melting endotherm for the propylene-alpha olefin copolymers of this invention.

FIG. 17, which shows the maximum heat flow normalized by the heat of melting as a function of the heat of melting, further demonstrates the broadening of the melting endotherm. This is because, at equivalent heat of melting, a lower peak value implies that the distribution must be broadened to give the same area. Roughly approximating the shape of these melting curves as a triangle, for which the area is given by the formula one-half times the base times the height, then $b1/b2=h2/h1$. The inventive copolymers show as much as a four-fold decrease in height, implying a significant increase in breadth.

Figure 18:
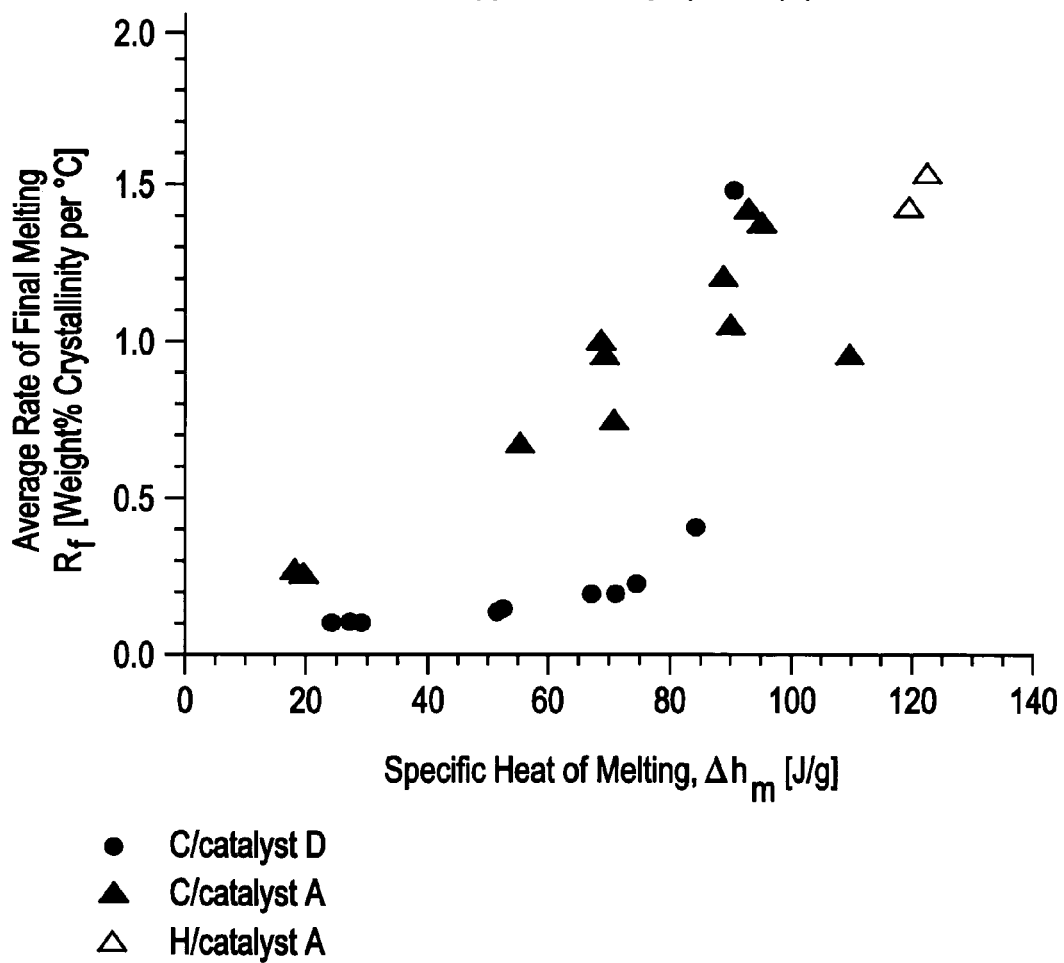
FIG. 18 illustrates that the rate at which the last portion of crystallinity disappears in the inventive polymers is significantly lower than for metallocene polymers.

FIG. 18 illustrates a useful aspect of the broader melting range of the propylene-alpha olefin copolymers of the invention, namely that the rate at which the last portion of crystallinity disappears (units: weight % crystallinity per ° C.) is significantly lower than for metallocene copolymers.

Together the data in Table 8-2 demonstrate in practical terms the physical properties that are exhibited by a propylene-alpha olefin copolymer having a broad composition distribution and the other requirements of the propylene-alpha olefin copolymer of our inventive blend. Entries in Table 8-2 illustrate: (1) the extent to which a greater fraction of melting occurs at lower temperatures, which is important for heat seal and bonding applications, and which is greater for the propylene-ethylene copolymers of the invention; and (2) the extent to which crystallinity remains at higher temperatures and the rate at which the final portion of crystallinity disappears, which can be important for fabrication operations such as thermoforming, foaming, blow molding, and the like, both of which are greater for the propylene-ethylene copolymers of the invention.

TABLE 8-1

Melting Results from DSC

| Sample* | Ethylene (mole %) | $\Delta h_m$ (J/g) | $T_{max}$ (° C.) | $T_1$ (° C.) | $(dq/dt)_{max}/\Delta h_m$ (sec$^{-1}$) | $V_1$ (° C.$^2$) | $T_{1\%c}$ (° C.) | $R_f$ (**) |
|---|---|---|---|---|---|---|---|---|
| 8-1-1 | 0.0 | 90.4 | 139.0 | 123.5 | 0.0109 | 416 | 143.0 | 1.60 |
| 8-1-2 | 0.0 | 94.3 | 138.8 | 122.2 | 0.0105 | 505 | 143.1 | 1.54 |
| 8-1-3 | 0.0 | 94.0 | 139.4 | 122.4 | 0.0105 | 505 | 143.3 | 1.60 |
| 8-1-4 | 0.0 | 95.9 | 139.5 | 121.4 | 0.0102 | 576 | 143.4 | 1.60 |
| 8-1-5 | 1.5 | 92.4 | 138.2 | 118.4 | 0.0105 | 630 | 142.0 | 1.48 |
| 8-1-6 | 4.3 | 85.0 | 120.7 | 99.2 | 0.0045 | 716 | 135.0 | 0.40 |
| 8-1-7 | 8.2 | 67.5 | 85.9 | 83.8 | 0.0023 | 909 | 139.7 | 0.19 |
| 8-1-8 | 8.2 | 71.2 | 93.0 | 84.4 | 0.0025 | 835 | 137.5 | 0.19 |
| 8-1-9 | 8.2 | 74.6 | 108.2 | 87.0 | 0.0029 | 790 | 134.6 | 0.23 |
| 8-1-10 | 11.8 | 51.6 | 71.7 | 69.3 | 0.0024 | 790 | 124.4 | 0.14 |
| 8-1-11 | 11.8 | 52.5 | 74.8 | 69.4 | 0.0025 | 781 | 123.7 | 0.14 |
| 8-1-12 | 11.8 | 51.9 | 73.9 | 69.4 | 0.0025 | 802 | 124.3 | 0.14 |
| 8-1-13 | 15.8 | 24.0 | 55.2 | 66.7 | 0.0031 | 667 | 112.0 | 0.10 |
| 8-1-14 | 15.8 | 28.7 | 55.2 | 66.3 | 0.0026 | 795 | 118.0 | 0.10 |
| 8-1-15 | 15.8 | 27.6 | 55.6 | 66.0 | 0.0026 | 783 | 116.4 | 0.10 |
| 8-1-16 | 15.8 | 26.9 | 55.2 | 66.4 | 0.0026 | 769 | 115.7 | 0.10 |
| 8-1-17a | 0.0 | 120.7 | 160.3 | 145.3 | 0.0104 | 457 | 165.9 | 1.43 |
| 8-1-17b | 0.0 | 123.9 | 159.8 | 144.5 | 0.0105 | 486 | 165.2 | 1.54 |
| 8-1-18 | — | 90.3 | 140.6 | 125.0 | 0.0076 | 419 | 146.1 | 1.21 |
| 8-1-19 | — | 91.3 | 139.0 | 123.9 | 0.0068 | 374 | 145.5 | 1.05 |
| 8-1-20a | 4.2 | 110.2 | 137.7 | 121.8 | 0.0094 | 337 | 144.3 | 0.95 |
| 8-1-20b | 4.2 | 96.5 | 137.9 | 121.1 | 0.0100 | 451 | 142.7 | 1.38 |
| 8-1-21 | — | 94.6 | 136.7 | 120.3 | 0.0086 | 385 | 140.5 | 1.43 |
| 8-1-22a | 8.0 | 71.4 | 117.5 | 105.8 | 0.0081 | 197 | 124.8 | 0.74 |
| 8-1-22b | 8.0 | 69.7 | 117.0 | 103.4 | 0.0080 | 271 | 122.8 | 1.00 |
| 8-1-23 | — | 70.1 | 110.3 | 91.0 | 0.0062 | 512 | 115.9 | 0.95 |
| 8-1-24 | — | 55.9 | 97.0 | 78.7 | 0.0052 | 436 | 103.9 | 0.67 |
| 8-1-25 | — | 19.8 | 63.0 | 61.1 | 0.0044 | 188 | 80.1 | 0.25 |
| 8-1-26 | — | 18.2 | 56.6 | 58.8 | 0.0049 | 158 | 75.3 | 0.27 |

*Samples 8-1-1 to -4 made with catalyst C, samples -5 to -16 with catalyst D, and -17 to -24 with catalyst A.
** Units for $R_f$: weight % crystallinity per ° C.

TABLE 8-2

Broadening of the Melting Endotherm

| Sample | Starting Crystallinity (weight %) | Fraction Melted at $T_1 - 30°$ C. | Fraction Melted At $T_1 - 20°$ C. | Fraction Remaining at $T_1 + 20°$ C. | fraction remaining at $T_1 + 30°$ C. |
|---|---|---|---|---|---|
| 8-2-8 (inventive) | 43.2 | 0.153 | 0.229 | 0.249 | 0.134 |
| 8-2-22a (comparative) | 43.3 | 0.040 | 0.112 | 0.019 | 0.004 |
| 8-2-11 (inventive) | 31.8 | 0.143 | 0.235 | 0.221 | 0.131 |
| 8-2-25 (comparative) | 33.9 | 0.103 | 0.170 | 0.127 | 0.009 |

Example 9

Examples 9 and 10 demonstrate that the propylene-alpha olefin copolymers of the current invention have flexible and elastic characteristics as compared to metallocene copolymers. Table 9 reports the details behind FIGS. 7 and 8. All these samples were made by a solution polymerization process. Homopolymer samples 9-1 and 9-12 were made with catalysts A and C, respectively. Comparative metallocene propylene-ethylene copolymer samples 9-2 through 9-11 were made with Catalyst A. P/E* copolymer samples 9-13 through 9-16 were made with catalyst D. Mole % ethylene was determined by $^{13}$C-NMR. $T_{max}$ was determined by DSC, second heating scan at 10° C./min. Flexural modulus values in Table 9 are either from: (a) direct measurement on injection molded specimens by ASTM D790 (samples marked by asterisks); or (b) measurement of tensile modulus on compression molded microtensile specimens by ASTM D638 then use of established correlations between tensile and flexural moduli to estimate the flexural modulus; or (c) estimation of flexural modulus from correlations of flexural modulus to heat of fusion by DSC. Haze was measured on 10 mil thick compression molded films by ASTM D1003 using Model XC211 Haze-Gard System manufactured by Pacific Scientific, Gardner/Neotec Instrument Division. Films for haze measurements were compression molded at 200° C. with six minute preheat at low pressure plus four minute molding at about 200 psi pressure, followed by ten minute cooling to 30° C. at 200 psi pressure. Mylar film was used as backing in contact with the polymer in order to obtain films with minimal surface haze. After molding, films or other specimens were aged two weeks or longer at room temperature prior to mechanical testing or haze testing.

TABLE 9

Figure 7:
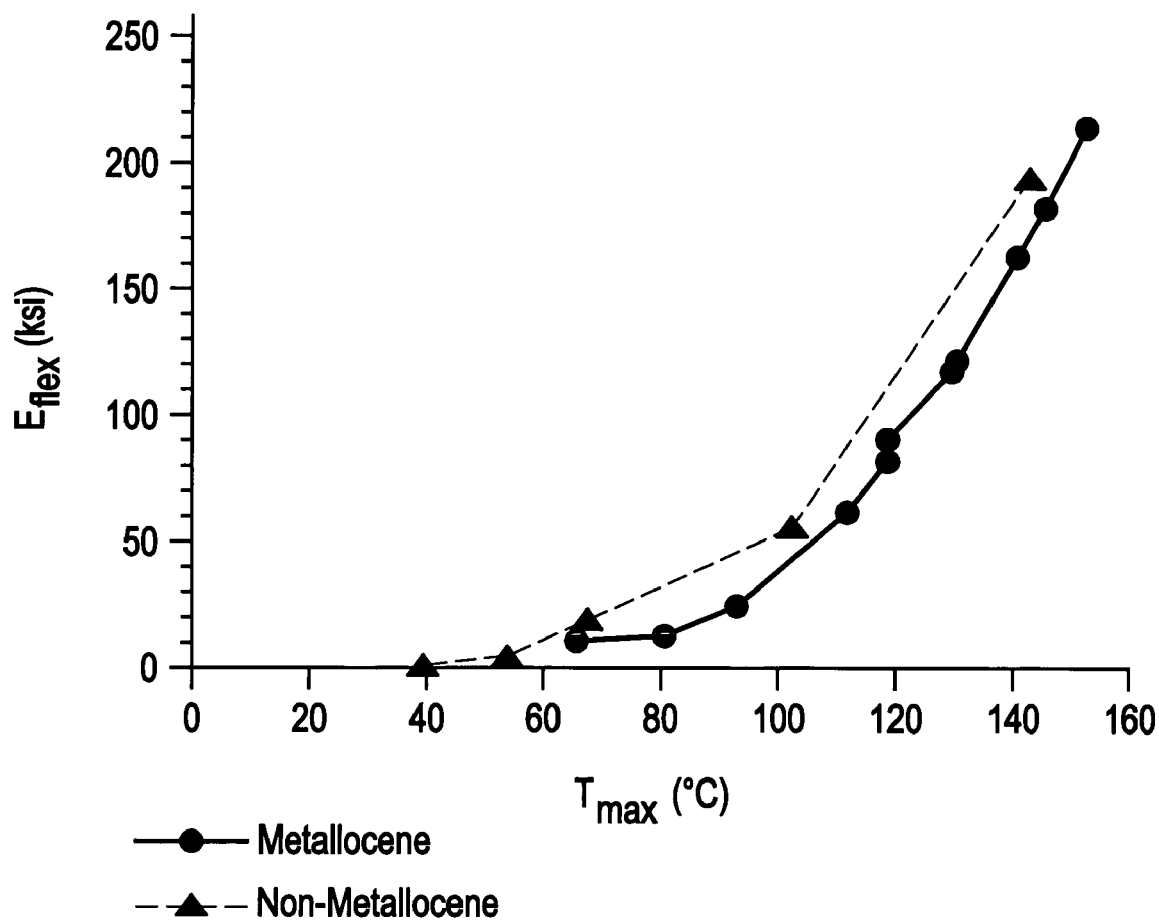
FIG. 7 shows an Eflex versus $T_{max}$ comparison of a conventional metallocene catalyzed P/E copolymer and a P/E* copolymer of this invention.
Figure 8:
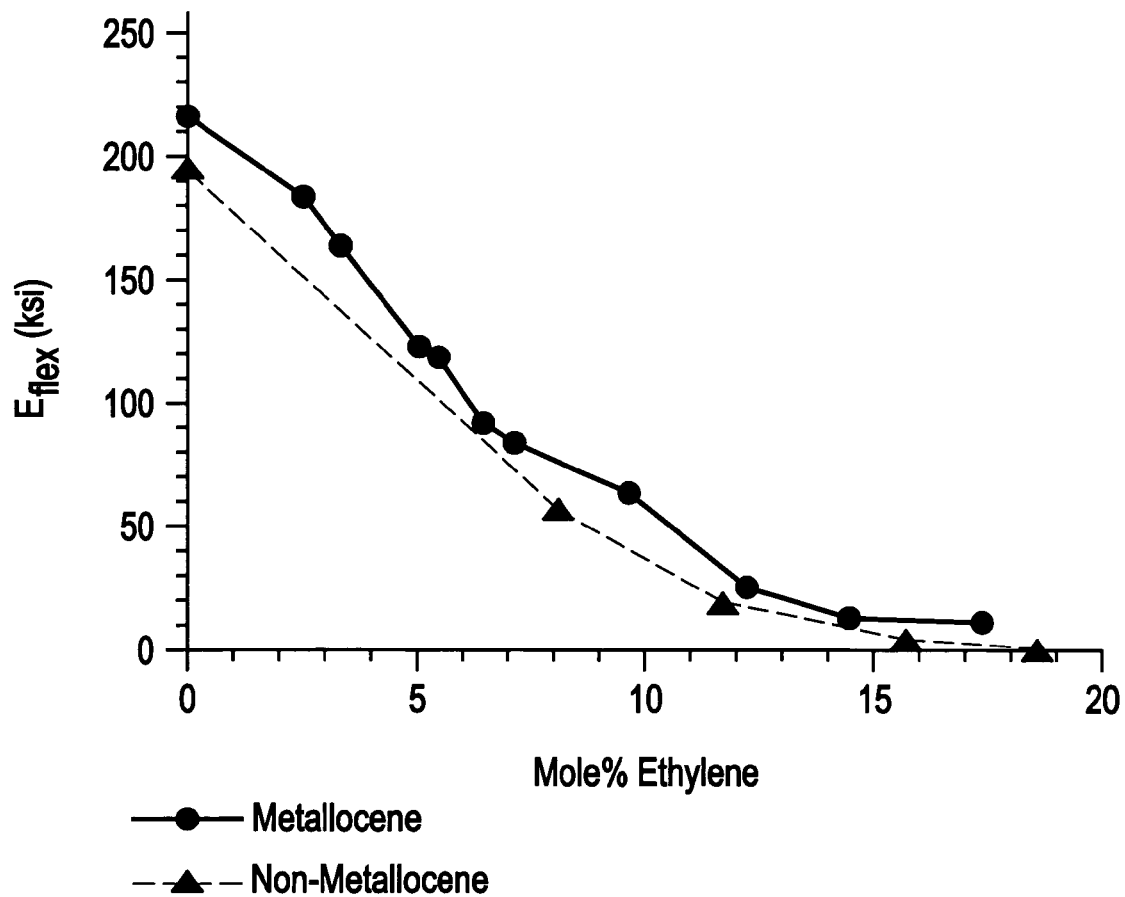
FIG. 8 shows an Eflex versus mole percent ethylene comparison of a conventional metallocene catalyzed P/E copolymer and a P/E* copolymer of this invention.

Data for FIGS. 7-8

| Sample | Mole % E | $T_{max}$ (° C.) | $E_{flex}$ (ksi) | % Haze |
|---|---|---|---|---|
| 9-1* | 0 | 154 | 216 | 49.5 |
| 9-2 | 2.6 | 147 | 183 | 31.2 |
| 9-3 | 3.4 | 142 | 163 | 29.1 |
| 9-4 | 5.1 | 132 | 122 | 30.0 |
| 9-5 | 5.5 | 131 | 118 | 30.4 |
| 9-6* | 6.5 | 120 | 91 | 30.8 |
| 9-7* | 7.2 | 120 | 83 | 34.2 |
| 9-8 | 9.8 | 113 | 63 | 30.6 |
| 9-9 | 12.3 | 94 | 26 | 24.4 |
| 9-10 | 14.6 | 81 | 14 | 20.6 |
| 9-11 | 17.4 | 66 | 12 | 21.3 |
| 9-12* | 0 | 144 | 195 | 33.3 |
| 9-13 | 8.2 | 104 | 57 | 27.0 |
| 9-14* | 11.8 | 68 | 20 | 22.3 |
| 9-15* | 15.8 | 54 | 5.6 | 14.0 |
| 9-16* | 18.6 | 39 | 1.6 | 13.2 |

Example 10

Figure 9:
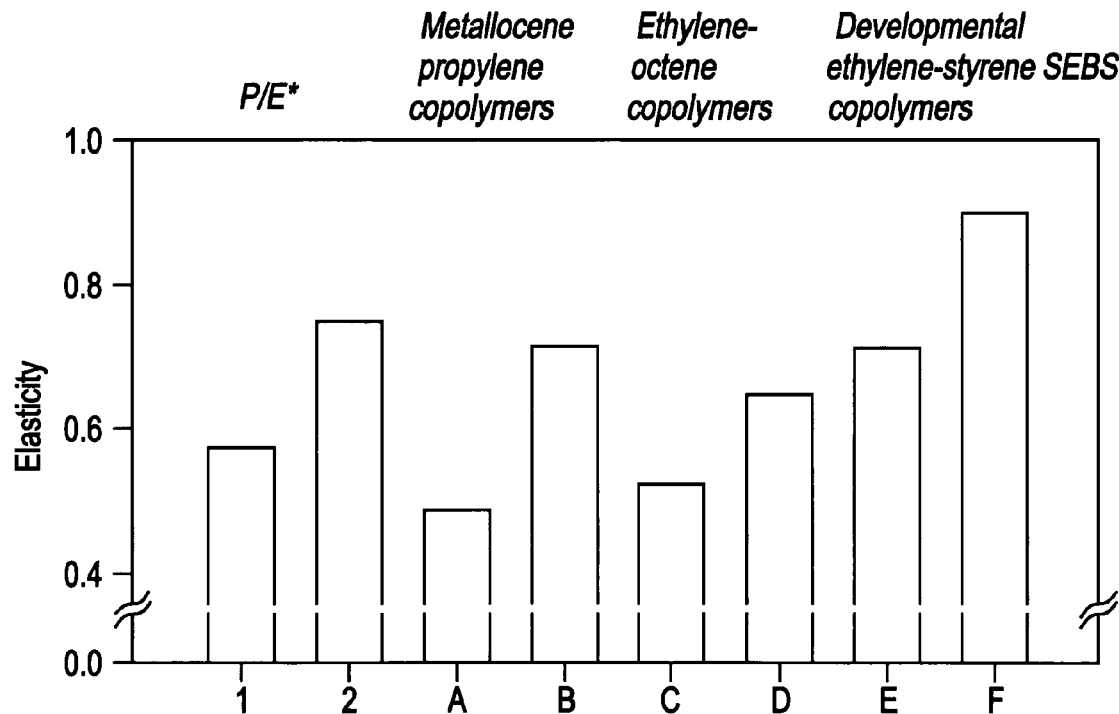
FIG. 9 is a bar graph comparing the elasticity of P/E* copolymers of this invention against various conventional thermoplastic elastomers.

FIG. 9 report certain elasticity data for the polymers of this invention and certain comparative polymers. Table 10-1 describes the elastomers.

The test samples were compression molded specimens. Polymer in pellet form was compression molded at 190 C into 1.5 mm thick sheets. The sheets were cooled by placing each between two platens at 25 C under light pressure. The specimens were allowed to age for at least seven days at ambient conditions before testing.

Tensile "dog bones" were punched out of the sheets using a knife shaped according to ASTM D-1708. The first melting behavior was measured by cutting out a 5 to 10 mg piece of the aged specimen. The specimen was loaded into an aluminum pan and analyzed in a differential scanning calorimeter manufactured by TA Instruments Incorporated. Heating spanned −50 to 230 C at 10 C/min.

The specimens were tested in uniaxial tension with a mechanical test device (Instron Corp.) fitted with pneumatic grips. The engineering strain rate was 400% per minute. Both strain to break and multicycle loading strain histories were used. In the case of multicycle loading, specimens were loaded and unloaded to various strains (100 to 900%) for up to 10 cycles. No pause was used between successive cycles.

TABLE 10-1

Elastomers

| Polymer Samples | Description | Copolymer (wt. %) | Copolymer (mol %) | DSC Crystallinity (wt. %) |
|---|---|---|---|---|
| 1 | PE* copolymer | 11 | 16 | 18 |
| 2 | PE* copolymer | 13 | 19 | 10 |
| A | Metallocene propylene-ethylene copolymer | — | — | 21 |
| B | Metallocene propylene-ethylene copolymer | — | — | 4 |
| C | Developmental ethylene-octene copolymer5 | 41 | 15 | 14 |
| D | Affinity EG8100 | 35 | 12 | 6 |
| E | Developmental ethylene-styrene copolymer | 41 | 16 | 5 |
| F | Kraton G-1657 (SEBS) | — | — | — |

Example 11

The following Examples show the improved physical properties exhibited by selected formulations of the inventive blend. The propylene-alpha olefin copolymers of this example have similar molecular weight distributions as the P/E* copolymers of examples 2 through 6, and also exhibit similar broad composition distributions. The blends include both two-component and three component inventive blends. Tables 11-1 and 11-2 show the physical properties for several two component and three component blends versus a comparative blend made using a two Ziegler-Natta polymers.

General Continuous Loop Solution
Propylene-Ethylene Copolymerization Procedure
(Example 11)

The P/E* copolymers were made according to the following procedure. Catalyst F was used to manufacture all the propylene-alpha olefin copolymers of Example 11.

The propylene polymerization process is exothermic. There are 900 BTU released per pound of propylene polymerized and 1,500 BTU released per pound of ethylene polymerized. The primary process design consideration is how to remove the heat of reaction. The P/E* copolymer of Example 11 were produced in a low-pressure, solution polymerization loop reactor, made up of a 3" loop pipe plus two heat exchanges, the total volume of which is 26.9 gals. Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentrations equal to 18 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selxsorb COS for purification before mixing with the recycle stream (contains solvent, propylene, ethylene, and hydrogen). After mixing with the recycle stream, the combined stream is passed through a bed of 75 wt % Molecular Sieve 13x and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (5° C.). The reactor operates at 525 psig and a control temperature equal to 105° C. The propylene conversion in the reactor is maintained by controlling the catalyst injection rate. The reaction temperature is maintained by controlling the water temperature across the shell side of the heat exchanger at 85° C. The residence time in the reactor is short, 15 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

The Blends of Example 11

The components of the blends of samples 11-2 through 4 were batch mixed on a Kobelco Batch Mixer. The polypropylene was first loaded in the mixer. The propylene-alpha olefin copolymers were added next and a second elastomer, if indicated. The total mixing time was approximately three minutes at 100 rpm. Cooling cycle began after the resins had completely mixed to form chips. The chips were reduced in size using a Glen Mills Type P-15 laboratory grinding mill.

The ground chips from above and pelleted components for the blend of samples 11-1 and 11-5 were further compounded on a Werner & Pfleiderer ZSK-30, 30-mm twin-screw extruder. The extruder speed was set at 350 rpm's and the extruder temperature was about 200° C. The extrusion rate was about 40 lb./hr. A Conair pellitizer was used to chop the strands to form pellets at the outlet of the extruder.

The pelleted compounds from above for samples 11-1 through 1'-5 and the individual components of the blend for samples 11-6 through 11-12 were fabricated into films on a Haake 25-mm twin screw extruder equipped with a TPI Tape Postex with a 6 inch sheet die. One KTron Volumetric feeder was used. Haake PolyLab Monitor monitored the fabrication process. The set point for the feeder was 500. The extruder operated at about 200° C. and 500 psi. A Conair Tempro press was used to flatten out the sheet after the film rolled out from the chill roll.

For compression molding tests, the samples were melted at 190° C. for 3 minutes and compression molded at 190° C. under 5.5 MPa pressure for 2 min. The molten materials were then quenched in a press equilibrated at room temperature.

Polymers:

P/E* S1 is a propylene-ethylene copolymer made as described above, containing 13 percent by weight units derived from ethylene and having a melt flow rate of 5 g/10 min. This copolymer exhibited a heat of fusion of 16 Joules/gram and a MWD of about 2.5.

P/E/O S1 is a propylene-ethylene-octene terpolymer made in an analogous manner as Examples 2-6 using catalyst F and containing 6 percent by weight units derived from ethylene and 25 percent by weight units derived from 1-octene having a melt flow rate of 2 g/0 min. Thisterpolymer exhibited a heat of fusion of 4 Joules/gram and a MWD of about 2.5.

P/E/O S2 is a propylene-ethylene-octene terpolymer made in an analogous manner as Examples 2-6 using catalyst F and containing 8 weight percent units derived from ethylene and 17 weight percent units derived from 1-octene having a melt flow rate of 2 g/10 min. This terpolymer exhibited a heat of fusion of 5 Joules/gram and a MWD of about 2.5.

P/E/0 S3 is a propylene-ethylene-octene terpolymer made in an analogous manner as Examples 2-6 using catalyst F and containing 9 percent by weight units derived from ethylene and 10 percent by weight units derived from 1-octene having a melt flow rate of 2 g/10 min. This terpolymer exhibited a heat of fusion of 12 Joules/gram and a MWD of about 2.5.

P/E* S2 is a propylene-ethylene copolymer made as described above, containing 14 percent by weight units derived from ethylene and having a melt flow rate of 2 g/10 min. This copolymer exhibited a heat of fusion of 12 Joules/gram and a MWD of about 2.5.

P/E* S3 is a propylene-ethylene copolymer made as described above, containing 15 percent by weight units derived from ethylene and having a melt flow rate of 2 g/10 min. This copolymer exhibited a heat of fusion of 8 Joules/gram and a MWD of about 2.5.

P/E* S4 is a propylene-ethylene copolymer made as described above, containing 15 percent by weight units derived from ethylene and having a melt flow rate of 8 g/10 min. This copolymer exhibited a heat of fusion of 8 Joules/gram, a MWD of about 2.5, and a glass transition temperature of about −30° C.

P/E* S5 is a propylene-ethylene copolymer made as described above, containing 8 percent by weight units derived from ethylene and having a melt flow rate of 2 g/10 min. This copolymer exhibited a heat of fusion of 47 Joules/gram and a MWD of about 2.5.

DS6D21 is random propylene copolymer made with a Ziegler-Natta catalyst available from The Dow Chemical Company under the designation DS6D21 having 3 percent by weight units derived from ethylene and a melt flow rate of 8 g/10 min. This copolymer exhibits a heat of fusion of approximately 93 Joules/gram, a MWD of about 4.5 and a melting point $T_{max}$ of about 145° C.

6D83K is a random propylene copolymer made with a Ziegler-Natta catalyst available from The Dow Chemical Company under the designation 6D83K having 3 percent by weight units derived from ethylene and a melt flow rate of 2 g/10 min. This copolymer exhibits a heat of fusion of approximately 93 Joules/gram, a MWD of about 4.5 and a melting point $T_{max}$ of about 145° C.

KS358 is believed to be a blend of (1) about 50 percent by weight random propylene copolymer containing about 6 percent by weight units derived from ethylene, and (2) about 50 percent by weight of a propylene-ethylene copolymer rubber containing about 30 percent by weight units derived from ethylene having a melt flow rate of 0.45 g/10 min, which is available from Basell Polyolefins under the tradename ADFLEX.

KS359 is believed to be a blend of (1) about 50 percent by weight random propylene copolymer containing about 6 percent by weight units derived from ethylene, and (2) about 50 percent by weight of a propylene-ethylene copolymer rubber containing about 30 percent by weight units derived from ethylene having a melt flow rate of 12 g/10 min, which is available from Basell Polyolefins under the tradename ADFLEX.

EG 8180 is a ethylene-1-octene copolymer made with a constrained geometry catalyst having a melt index of 1 g/10 min, a density of 0.863 g/cc, and exhibiting a glass transition temperature of about −60° C. available from The Dow Chemical Company.

Unless otherwise indicated below (or by the specific test procedure), the blends were formed into 20 mil extruded films and tested for the physical properties shown in Tables 11-1 and 11-2.

The data of Tables 11-1 and 11-2 show the excellent balance of flexibility (low modulus), heat resistance (TMA and Vicat) and mechanical properties (tensile strength and tear resistance) exhibited by the inventive blends. Preferably, the ultimate tensile strength is at least 1,000 psi, more preferably at least 1,500 psi, further more preferably at least 2000 psi. When ultimate tensile strength is particularly important factor for the blend, the ultimate tensile strength preferably is at least 2500 psi, more preferably at least 3000 psi, and in some

TABLE 11-1

Summary of Physical Properties for Inventive Blends

| Sample # | Blend component 1 Propylene-alpha olefin Copolymer | Blend component 2 Polypropylene | Blend component 3 | Wt Ratio 1 to 2 | | Wt Ratio 1:2:3 | Tensile Secant Modulus Avg 2% Secant psi | Tensile Strength psi | Tensile Elongation % | TMA Temp ° C. | Vicat Temp ° C. | Shore A Average (@ 5 Seconds) |
|---|---|---|---|---|---|---|---|---|---|---|---|---|
| 11-1 | P/E* S1 | DS6D21 | | 50 | 50 | | 12300 | 3290 | 610 | 134 | 67 | 89 |
| 11-2 | P/E/O S1 | 6D83K | | 70 | 30 | | 2820 | 2090 | 800 | 118 | 43 | 71 |
| 11-3 | P/E/O S2 | 6D83K | | 50 | 50 | | 14120 | 2300 | 680 | 136 | 81 | 92 |
| 11-4 | P/E/O S3 | 6D83K | | 70 | 30 | | 6970 | 2780 | 780 | 123 | 52 | 83 |
| 11-5 | P/E* S2 | 6D83K | P/E* S5 | | | 25 50 25 | 23410 | 3460 | 830 | 138 | 90 | 90 |
| 11-6 | Reference Material, 70 wt % KS358, 30 wt % KS359 | | | | | | 12320 | 3220 | 720 | 121 | 51 | 88 |

TABLE 11-2

Summary of Physical Properties for Inventive Blends

| Sample # | Blend component 1 Propylene-alpha olefin Copolymers | Blend component 2 Polypropylene | Blend component 3 | Wt Ratio 1 to 2 | Wt Ratio 1:2:3 | 2% Tensile Secant Modulus (psi) | Tensile Strength (psi) | Tensile Elongation, % | Tear Resistance, lbs/in | TMA, ° C. | Vicat, ° C. | Brittleness Point, ° C. Zero brks |
|---|---|---|---|---|---|---|---|---|---|---|---|---|
| 11-7 | P/E* S3 | DS6D21 | | 50 50 | | 15730 | 4050 | 630 | 571 | 135 | 80 | −35 |
| 11-8 | P/E* S3 | DS6D21 | | 60 40 | | 11560 | 3750 | 630 | 466 | 130 | 47 | −35 |
| 11-9 | P/E* S4 | DS6D21 | EG8180 | | 40:50:10 | 19990 | 3760 | 680 | 519 | 135 | 77 | −50 |
| 11-10 | P/E* S4 | DS6D21 | EG8180 | | 30:50:20 | 23500 | 4150 | 760 | 554 | 136 | 89 | −60 |
| 11-11 | P/E* S4 | DS6D21 | EG8180 | | 48:40:12 | 13880 | 3200 | 780 | 447 | 132 | 66 | −55 |
| 11-12 | P/E* S4 | DS6D21 | EG8180 | | 36:40:24 | 17960 | 3740 | 790 | n/m | 132 | 51 | −70 |
| 11-6 | Reference Material, 70 wt % KS358, 30 wt % KS359 | | | | | 12320 | 3220 | 720 | 447 | 118 | 50 | −60 | instances at least 3500 psi. Additionally, the inventive blends preferably exhibit ultimate tensile elongation of at least 500%, more preferably at least 600%, and in some instances at least 700%, preferably at least 750%.

In particular, the following points are made regarding the inventive blends of Tables 11-1 and 11-2.

Table 11-1: P/E*-RCP Blends

Sample 11-1: Similar modulus as comparative sample 11-6 but higher heat resistance (TMA, Vicat); this blend will be useful in applications such as, wire and cable, stationary, coated fabrics and artificial leather.

Sample 11-2: Lower modulus (much better flexibility) and similar TMA as compared to comparative sample 11-6; this blend when combined with oil, filler and other elastomer such as styrenic block copolymers is useful in applications such as, coated fabrics, artificial leather, and soft-touch.

Sample 11-3: Similar modulus as sample 11-1, but higher Vicat temperature; this blend is useful in applications such as, geo-membranes and roofing membranes, wire and cable, stationary, coated fabrics and artificial leather. This sample shows that the use of a propylene-alpha olefin terpolymer leads to improvements in the heat resistance of the blends.

Sample 11-4: Lower modulus and similar heat resistance (TMA, Vicat) as compared to comparative sample 11-6; this blend when combine with oil, filler and other elastomer such as styrenic block copolymers will be useful in coated fabrics, artificial leather, and soft-touch applications.

Sample 11-5: Similar shore A as 11-6 but significantly higher Vicat temperature; this blend will be particularly useful for geo-membranes and roofing membranes, wire and cable applications, stationary, coated fabrics and artificial leather.

Table 11-2: P/E*-E/O-RCP Blends

Sample 11-7: Lower flexibility but higher heat resistance and tensile strength versus comparative sample 11-6; this blend will be particularly useful for geo-membranes and roofing membranes, wire and cable, stationary, coated fabrics and artificial leather applications.

Sample 11-8: Similar modulus but higher TMA versus sample 11-6; this blend will be useful in geo-membranes and roofing membranes, wire and cable, stationary, coated fabrics and artificial leather.

Sample 11-9 through 11-12: Better low temperature property (lower brittleness point) versus sample 11-7. This Sample shows that by adding a relatively small amount of ethylene-octene elastomer, the brittleness point can be significantly lowered, while maintaining the other advantageous properties of the blend.

The properties recorded in Tables 11-1 and 11-2 were determined as follows:

TMA, "thermal mechanical analysis", is the upper service temperature determined from a thermal mechanical analyzer (Perkin-Elmer TMA 7 series) scanned at 5 C/min and a load of 1 Newton, and defined as the temperature at which the probe penetrates 1 mm into the sample. The samples are compression molded 80 mil (203 micrometers) thick films.

Ultimate Tensile Strength was determined in accordance with ASTM-C412, in the machine direction. The samples are 20 mil (51 micrometer) thick extruded films.

2% Secant Tensile Modulus is measured in accordance with ASTM-D882, in the machine direction. The samples are 20 mil (51 micrometer) thick extruded films.

Vicat Temperature is measured in accordance with ASTM-D1525. The samples are 125 mil (318 micrometer) thick compression molded films.

Tear (Gullwing test) Resistance is determined on 45 mil (114 μm) compression molded samples in accordance with ASTM-D624.

Brittleness Point is determined in accordance with ASTM-D-2136. The samples are 50 mil (127 micrometer) thick compression molded films.

Shore A was determined in accordance with ASTM-D2240

Heat Seal Test: The heat seal strength of a 20 mil extruded film of sample 11-8 was measured using the "JB Instrument Heat Seal Strength Test Method," which is designed to measure the force required to separate a seal after the material has completely cooled to 23° C. The film sample was exposed to a relative humidity of 50 percent and a temperature of 23° C. for a minimum of 24 hours prior to testing.

The seal strength of the film sample was determined using an Instron Tensile Tester Model #1122 according to the following test conditions:

| | |
|---|---|
| Direction of Pull: | 90° to seal |
| Crosshead Speed: | 500 mm/minute |
| Full Scale Load: | 5 kg |
| Number of Samples/Threshold: | 1 percent of FSL |
| Break Criterion: | 80 percent |
| Gauge Length: | 2.0 inches (50.8 millimeters) |
| Sample Width: | 1.0 inch (25.4 millimeters) |

Figure 10:
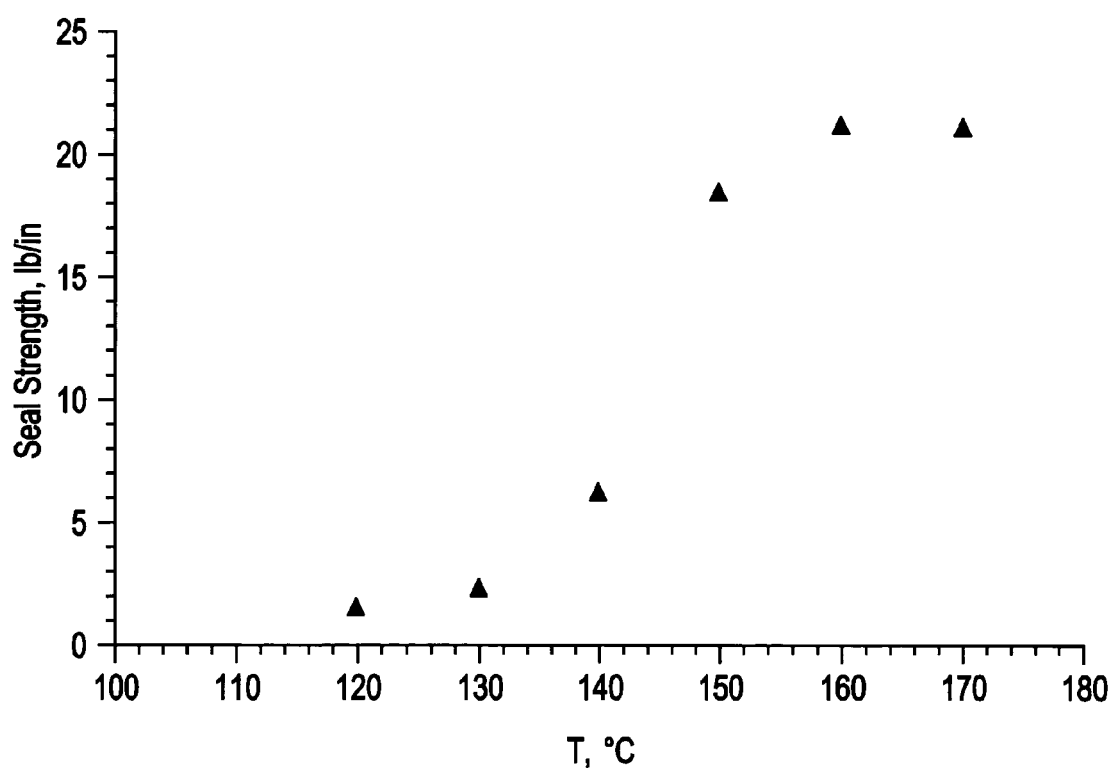
FIG. 10 shows the heat sealing behavior of sample 11-8 of Example 11.

Heat seal initiation temperature is defined as the minimum temperature for 2 lb/in (0.4 Kg/cm) seal strength. The heat seal data are shown on FIG. 10.

End-Use Applications: The blends of the invention are useful for a variety of fabrication techniques, including, but not limited to, injection molding, compression molding, extrusion (both profile and sheet), calendering thermoforming and foaming.

The blends are particularly useful for making fabricated articles such as, calendered sheet, blow molded articles, and injection molded parts. The blends are also useful for TPO roofing membranes, wire and cable applications, shoe stiffeners/toe puffs, shoe soles, coated fabrics, artificial leather, calendered upholstery, auto interiors and sins, soft touch applications, dual durometer for toothbrush and razor handles, dedical and food tubing, glass interlayer coatings, weather stripping, gasket, stationary, thermoformed bottles, hosing applications, bottle cap liners, bitumen modifiers, carpet backing and flooring, elastic diaper back sheets, elastic diaper ears, elastic waistbands, elastic side-panels and other applications apparent to one of ordinary skill in the art.

Many of the above applications will take advantage of fillers and oils, to enhance the physical properties and processability of the blends.

We claim:

1. A thermoplastic olefin composition, comprising:
(a) at least about 40 percent by weight of a propylene-alpha olefin copolymer based on the total weight of polymers in the composition, the propylene-alpha olefin copolymer forming a continuous phase of the composition and the propylene-alpha olefin copolymer having:
(1) at least about 60 percent by weight units derived from propylene;
(2) at least about 5 percent by weight units derived from an alpha olefin;
(3) a molecular weight distribution less than about 3.5;
(4) a broad composition distribution;

(5) a heat of fusion of less than about 40 Joules/gram; and
(6) optionally, a glass transition temperature (Tgp) less than about −10° C.;
(b) at least about 20 percent by weight of a polypropylene based on the total weight of polymers in the composition, the polypropylene having:
  (1) at least about 93 percent by weight units derived from propylene;
  (2) a heat of fusion greater than the heat of fusion exhibited by the propylene-alpha olefin copolymer; and
  (3) a melting point $T_{max}$ of at least about 120° C.; and
(c) at least about 10 percent by weight of an ethylene-alpha olefin elastomer based on the total weight of polymers in the composition.

2. The thermoplastic olefin composition of claim 1, wherein the ethylene-alpha olefin elastomer is selected from the group consisting of: ethylene-propylene copolymer, ethylene-propylene-diene terpolymer, ethylene-butene copolymer, ethylene-4-methyl-1-pentene copolymer, ethylene-hexene copolymer, ethylene-octene copolymer, ethylene-heptene copolymer and mixtures thereof.

* * * * *